US009626576B2

(12) United States Patent
Grujic et al.

(10) Patent No.: US 9,626,576 B2
(45) Date of Patent: Apr. 18, 2017

(54) DETERMINING MAXIMALLY STABLE EXTERNAL REGIONS USING A PARALLEL PROCESSOR

(71) Applicant: MotionDSP, Inc., Burlingame, CA (US)

(72) Inventors: Nemanja Grujic, Nis (SE); Igor Mihajlovic, Nis (SE)

(73) Assignee: MotionDSP, Inc., Burlingame, CA (US)

( * ) Notice: Subject to any disclaimer, the term of this patent is extended or adjusted under 35 U.S.C. 154(b) by 0 days.

(21) Appl. No.: 14/214,034

(22) Filed: Mar. 14, 2014

(65) Prior Publication Data

US 2014/0286579 A1   Sep. 25, 2014

Related U.S. Application Data

(60) Provisional application No. 61/852,350, filed on Mar. 15, 2013.

(51) Int. Cl.
*G06K 9/00* (2006.01)
*G06K 9/44* (2006.01)
*G06T 7/00* (2017.01)

(52) U.S. Cl.
CPC .......... *G06K 9/00986* (2013.01); *G06K 9/44* (2013.01); *G06T 7/0081* (2013.01); *G06T 7/0091* (2013.01); *G06T 2207/20141* (2013.01); *G06T 2207/20152* (2013.01)

(58) Field of Classification Search
CPC ..... G06K 9/00986; G06K 9/44; G06T 7/0081
See application file for complete search history.

(56) References Cited

U.S. PATENT DOCUMENTS

| 7,519,220 | B2 | 4/2009 | Aharon et al. |
| 7,697,756 | B2 | 4/2010 | Aharon et al. |
| 7,706,633 | B2 | 4/2010 | Chefd'hotel et al. |
| 7,725,484 | B2 | 5/2010 | Nister et al. |

(Continued)

OTHER PUBLICATIONS

Cornelissen et al, Fibered fluorescence microscopy (FFM) of intra epidermal nerve fibers—translational marker for peripheral neuropathies in preclinical research: processing and analysis of the data, 2008, Proc. of SPIE vol. 7073, pp. 1-14.*

(Continued)

*Primary Examiner* — David F Dunphy
(74) *Attorney, Agent, or Firm* — Dov Rosenfeld; Inventek

(57) ABSTRACT

Embodiments of the present invention includes a method of determining MSER on a processing system that includes a parallel processor such as a GPU, the method including method steps carried out in parallel. Embodiments of the present invention also include an apparatus that includes a parallel processor and that is operative to carry out the method, and also logic, e.g., executable instructions configured on a non-transitory computer-readable media operative to carry out the method, and a non-transitory computer-readable medium encoded with such instructions. The method includes assigning to the pixels in an image metapixels of all connected pixels at a level, carrying out watershed in parallel on metapixels to determine catchment basins, and carrying out further steps, including steps executed in parallel to determine the MSER of the image.

21 Claims, 16 Drawing Sheets

(56) References Cited

U.S. PATENT DOCUMENTS

| | | | |
|---|---|---|---|
| 8,345,769 | B1 | 1/2013 | Diard et al. |
| 8,358,381 | B1 | 1/2013 | Diard et al. |
| 2005/0225678 | A1 | 10/2005 | Zisserman et al. |
| 2005/0226506 | A1 | 10/2005 | Aharon et al. |
| 2005/0271302 | A1 | 12/2005 | Khamene et al. |
| 2006/0104510 | A1 | 5/2006 | Aharon et al. |
| 2007/0291040 | A1 | 12/2007 | Bakalash et al. |
| 2009/0185752 | A1* | 7/2009 | Dwivedula .......... G06K 9/3233 382/256 |
| 2009/0232358 | A1 | 9/2009 | Cross et al. |
| 2010/0195914 | A1 | 8/2010 | Isard et al. |
| 2011/0313984 | A1 | 12/2011 | Zhou et al. |
| 2012/0314961 | A1 | 12/2012 | Isard et al. |

OTHER PUBLICATIONS

Matas et al, Robust wide baseline stereo from maximally stable extremal regions, 2002, Proc. of British Machine Vision Conference, pp. 384-396.*

Meyer, Topographic distance and watershed lines, 1994, Signal Processing 38 (1994), pp. 113-125.*

Nister et al, Linear Time Maximally Stable Extremal Regions, 2008, ECCV 2008, Part II, LNCS 5303, pp. 183-196.*

The Khronos Group, OpenCL [online], 2011 [retrieved May 28, 2015]. Retrieved from the Internet: <http://web.archive.org/web/20110721031202/http://www.khronos.org/opencl/>, p. 1.*

Kimmel et al, "Are MSER Features Really Interesting?" 2011, IEEE Transactions on Pattern Analysis and Machine Intelligence, vol. 33, No. 11, pp. 2316-2320.*

K. A. Hawick, A. Leist, and D. P. Playne. Parallel graph component labelling with gpus and cuda. Parallel Comput., 36(12):655-678, Dec. 2010.

Harris, Sengupta and Owens, "Parallel Prefix Sum (Scan) with CUDA(TM),"Chapter 39 of GPU GEMS 3, by H. Nguyen, Editor, GPU Gems 3, Addison-Wesley, ISBN 0-321-51526-9, also published by NVIDIA Corporation, Santa Clara, CA, retrieved Feb. 5, 2013 at http.developer.nvidia.com/GPUGems3/gpugems3_ch39.html.

M. Donoser and H. Bischof, "Efficient maximally stable extremal region (mser) tracking," in in Proc. of IEEE Computer Society Conference on Computer Vision and Pattern Recognition (CVPR), New York, USA, Jun. 17-22, 2006, pp. 553-560.

M. Couprie, L. Najman, and G. Bertrand. "Quasi-linear algorithms for the topological watershed," Journal of Mathematical Imaging and Vision, vol. 22, Nos. 2-3, pp. 231-249, 2005.

J. Matas ,O. Chum, M. Urban, and T. Pajdla. "Robust Wide Baseline Stereo from Maximally Stable Extremal Regions" in Proc. British machine vision conference, vol. 1, pp. 384-393. 2002.

A. Körbes, G. B. Vitor, R. de Alencar Lotufo, and J. V. Ferreira, "Analysis of a step-based watershed algorithm using cuda," International Journal on Natural Computing Research, vol. 1, No. 4, pp. 16-28, 2010.

D. Nistér and H. Stewénius. "Linear Time Maximally Stable Extremal Regions," in D. Forsyth, P. Torr, A. Zisserman, Eds, Computer Vision—ECCV 2008 (Proc., 10th European Conference on Computer Vision), Part II, pp. 183-196, vol. 4170 of Lecture Notes in Computer Science (LNCS), Springer, 2008.

L. Najman and M. Couprie, Building the Component Tree in Quasi-Linear Time, IEEE Trans. Image Processing, vol. 15, No. 11pp. 3531-3539, Nov. 2006. 3.

J. Sivic and A. Zisserman. Video Google: Efficient visual search of videos. In J. Ponce, M. Hebert, C. Schmid, and A. Zisserman, editors, Toward Category-Level Object Recognition, vol. 4170 of LNCS, pp. 127-144. Springer, 2006. 1.

Khronos OpenCL Working Group. "The OpenCL Specification, version 1.0. 29, Dec. 8, 2008."

Lin Cao, A Parallel Implementation of MSER detection, Project slides, Report for Final Project for Course CDA 6938,2008 Multi-core/Many-core Architectures and Programming (Prof. Huiyang Zhou), School of Electrical Engineering and Computer Science, University of Central Florida , FL, available (Feb. 6, 2013) at coachk.cs.ucf.edu/courses/CDA6938/projects/mser.ppt.

A. Vedaldi. An implementation of multi-dimensional maximally stable extremal regions, 2007.

Guy E. Blelloch "Prefix Sums and Their Applications"Technical Report CMU-CS-90-190, Department of Computer Science, Carneigie Melon University, Pittsburgh, PA, Nov. 1990, retrieved Feb. 12, 2013 at http://repository.cmu.edu/cgi/viewcontent.cgi?article=3017&context=compsci.

P. Matas, E. Dokl'adalov'a, M. Akil, T. Grandpierre, L. Najman, M. Poupa, and V. Georgiev. Parallel algorithm for concurrent computation of connected component tree. In Proceedings of the 10th International Conference on Advanced Concepts for Intelligent Vision Systems, ACIVS '08, pp. 230-241, Berlin, Heidelberg, 2008. Springer-Verlag.

Kristensen, Fredrik, and W. James MacLean. "Real-time extraction of maximally stable extremal regions on an FPGA." in *Circuits and Systems, 2007. ISCAS 2007. IEEE: International Symposium on*, pp. 165-168, IEEE, 2007.

H. Chen, S. S. Tsai, G. Schroth, D. M. Chen, R. Grzeszczuk, and B. Girod. Robust text detection in natural images with edge-enhanced maximally stable extremal regions. In 2011 IEEE International Conference on Image Processing, Brussels, Sep. 2011.

F. Meyer. Topographic distance and watershed lines. Signal Process., 38(1):113-125, Jul. 1994.

K. Mikolajczyk, T. Tuytelaars, C. Schmid, A. Zisserman, J. Matas, F. Schaffalitzky, T. Kadir, and L. V. Gool. A comparison of affine region detectors. Int. J. Comput. Vision, 65(1-2):43-72, Nov. 2005. 1.

Matas, Petr, Eva Dokladalova, Mohamed Akil, Vjačeslav Georgiev, and Martin Poupa. "Parallel hardware implementation of connected component tree computation," in *Field Programmable Logic and Applications (FPL), 2010 International Conference on*, pp. 64-69. IEEE, 2010.

\* cited by examiner

The Immersion analogy used in standard MSER methods.

Example: Watershed by topographic distance

Require: Image $I$, metapixel labels, pixel levels
Ensure: Catchment basin $Cb$ for every metapixel in $I$ function MINIMALNEIGHBOUR($I$, level, metapixel)
        $N \leftarrow metapixel$
        for all $pixel\ p$ in $I$ do in parallel
            $D \leftarrow neighbours(p) \cup \{p\}$
            $L_{min} \leftarrow \min_{x \in D} level(x)$
            $N_{min} \leftarrow metapixel(\arg\min_{x \in D} level(x))$
            if $N_{min} \neq metapixel(p)$ then
                AU($N(metapixel(p))$, $K_{min}$, $N$, $level$)
            end if
        end for
        return $N$
    end function function STEEPESTDESCENT($N$)
        for all $metapixel\ p$ in $I$ do in parallel
            $next \leftarrow N(p)$
            while $next \neq N(next)$ do
                $next \leftarrow N(next)$
            end while
            $Cb(p) \leftarrow next$
        end for
        return $Cb$
    end function

FIG. 6

Atomic update function ATOMICUPDATE(*address*, $K_{new}$, *keys*, *values*)
    $K_{old} \leftarrow keys(address)$
    repeat
        $K_a \leftarrow K_{old}$
        if $criteria(values(K_{new}), values(K_a))$ then
            $K_{old} \leftarrow aCAS(address, K_a, K_{new})$
        end if
    until $K_a = K_{old}$
end function

FIG. 11

| Watershed graph at each iteration | Output MSER tree at each iteration |
|---|---|
| 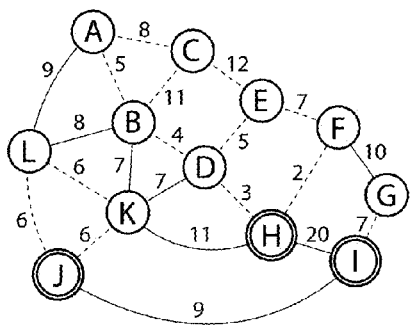 | 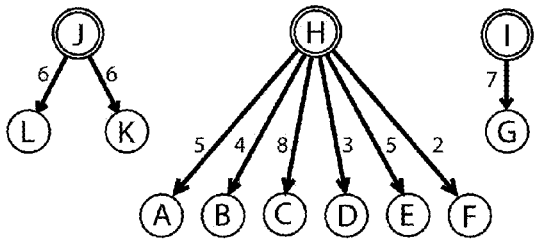 |
| J,H and I are roots. Dashed lines connect nodes from the same sub-tree. Solid lines connect nodes from different sub-trees. | Path compression. Nodes are directly connected to roots found in previous step. |
| 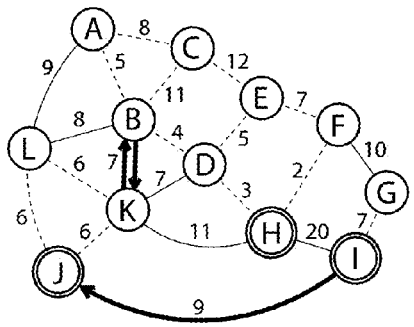 | 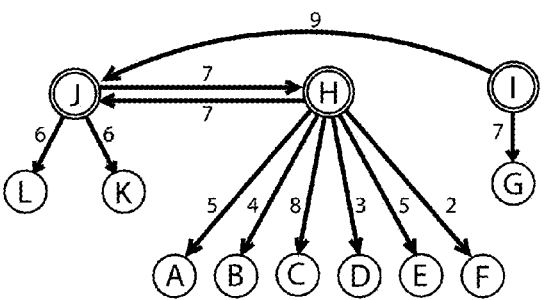 |
| Next iteration of steepest descent. Now, only edges between different sub-trees are processed. | Minimal neighbors between roots. |
| 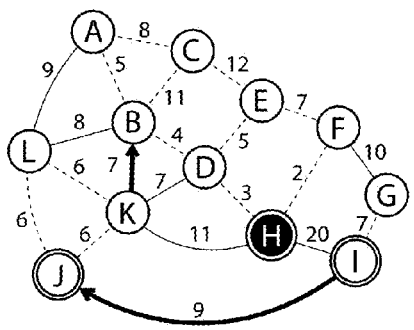 | 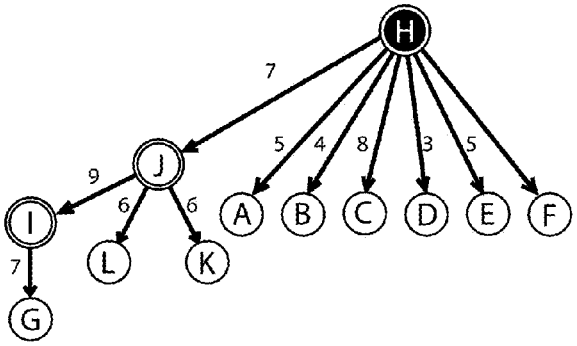 |
| Identify new roots by following the path of steepest descent. H is the only root left. | Update the tree. |

DETERMINING MAXIMALLY STABLE EXTERNAL REGIONS USING A PARALLEL PROCESSOR

RELATED PATENT APPLICATIONS

This invention is a conversion of and claims benefit of priority of U.S. Provisional Patent Application No. 61/852,350 filed 15 Mar. 2013 to inventors Grujic et al., titled DETERMINING MAXIMALLY STABLE EXTERNAL REGIONS IN PARALLEL, the contents of which are incorporated herein by reference

COPYRIGHT & TRADEMARK NOTICES

A portion of the disclosure of this patent document contains material that is subject to copyright protection. The copyright owner has no objection to the facsimile reproduction by any one of the patent document or the patent disclosure, as it appears in the files or records of any patent office in which the disclosure is filed, e.g., the U.S. Patent and Trademark Office, but otherwise reserves all copyrights whatsoever.

Certain marks referenced herein may be trademarks or registered trademarks of third parties. Use of these marks is solely for providing an enabling disclosure by way of example and is not to be construed as limiting the scope of this invention to material associated with such trademarks.

FIELD OF THE INVENTION

The present disclosure relates generally to processing of images, and in particular to determining maximally stable external regions in parallel, e.g., using a graphics processing unit (GPU).

BACKGROUND

Feature detector and detecting methods have grown increasingly popular in the field of image processing and computer vision in recent years. Affine covariant feature detectors especially became popular due to their broad application such as object recognition and tracking, image reconstruction, geo-mosaicking and many more. Compared to other image feature detectors, maximally stable extremal region (MSER) detectors perform well. A detected MSER (typically comprised of one or more detected regions) is closed under continuous geometric transformations and is invariant to affine intensity changes. See J. Matas, O. Chum, M. Urban, and T. Pajdla. "Robust Wide Baseline Stereo from Maximally Stable Extremal Regions," in Proc. British Machine Vision Conference BMVC, vol. 1, pp. 384-393. 2002, incorporated herein by reference, and hereinafter referred to as "Matas_2002." Due to its desired properties, use of MSER detectors has found application in wide variety of computer vision problems such as and object searching in video.

Both video and image resolution have grown significantly over the years. Currently, videos, and pictures from video cameras that each exceed 10 megapixels are common. For running computer vision and image processing method on videos and images with high resolution, more processing power is required. As a result, fast MSER algorithms have been developed and implementations are known for a sequential processor (CPU) and for a field programmable gate array (FPGA).

Parallel processing has become popular because of the availability of parallel processors such as graphics processing units (GPUs) sometimes called video processing units (VPUs) that include up to thousands of (in the future, possibly even more) processing elements in a parallel processor are each capable of computation on sets of data in parallel, and are referred to as "arithmetic logic units," "ALUs," and "cores". One reason general-purpose parallel processing using GPUs has become popular is the ease of programming GPUs because of the availability of set of programming models and related programming tools for some GPUs that a usable in combinations of at least one parallel processor and at least one general purpose computing element. One example programming model is CUDA™, created by NVIDIA® and available for many NVIDIA-produced GPUs. Another example is OpenCL (Open Computing Language), an open (royalty-free) standard for general purpose parallel programming across CPUs, GPUs and other processing devices. Both CUDA and OpenCL provide for software developers portable and efficient access to the power of these heterogeneous processing platforms. CUDA, for example, gives developers access to a virtual instruction set and memory of the parallel processing elements in CUDA-supported GPUs, such that GPUs become accessible for parallel computation to a connected CPU and a programming instructions running thereon. Unlike CPUs, however, GPUs have a parallel throughput architecture that emphasizes executing many threads concurrently.

The above-mentioned (CPU- or FPGA-implemented) fast MSER algorithms may not naturally fit for implementation on parallel machines such as a GPU.

BRIEF DESCRIPTION OF THE DRAWINGS

FIG. 6 shows pseudocode for a parallel method of carrying out watershed based on the topographic distance in accordance with aspects of an embodiment of the present invention.

FIG. 11 shows an example pseudocode of atomic update in accordance with an embodiment of the invention.

FIGS. 12A, 12B, and 12C illustrate the flow of the method on an example watershed graph in accordance with an embodiment of the invention.

EXAMPLE EMBODIMENTS OF THE INVENTION

Overview

Figure 1:
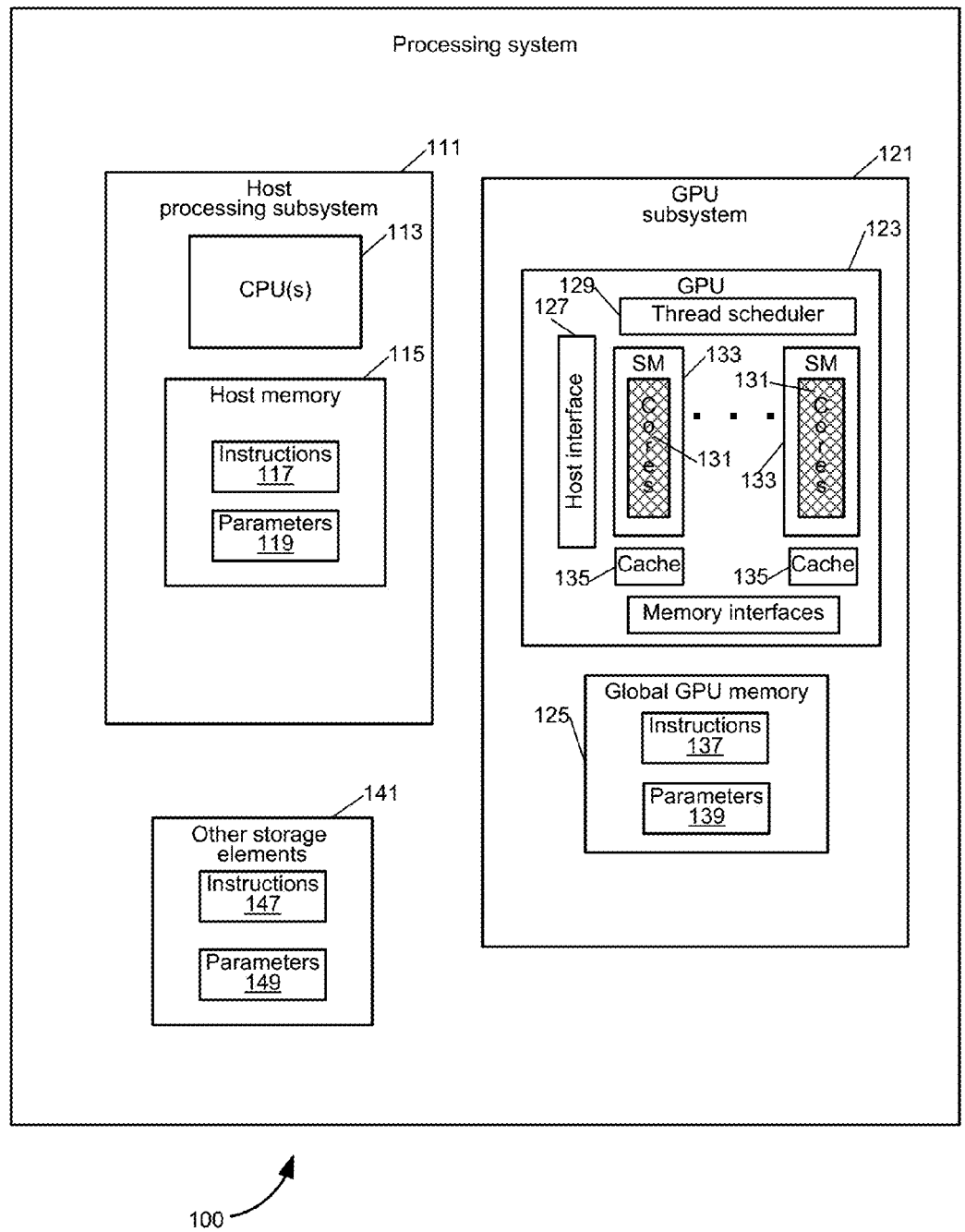
FIG. 1 shows a simplified block diagram of a processing system that includes an embodiment of the present invention.

Described herein is a method of detecting MSER, the method including parallel implementation on a parallel machine, e.g., modern graphical hardware such as a graphical processing unit (GPU). Also described herein is a non-transitory computer-readable medium containing instructions that when executed on a combination of a parallel machine, such as a GPU, and general processing subsystem, executes a method of determining the MSER of an image.

In example embodiments of the method described herein, a local intensity minimum that represents a family of extremal regions is independently assigned to each pixel. For each local intensity minimum, areas and stability values across intensity levels are calculated, and later, MSER threshold levels are independently calculated. This independence allows parallelization over pixels, and over intensity minima.

Some embodiments of the method described herein include a new method of determining watershed in parallel. The new method uses a topographic distance for the watershed calculation. To speed up the watershed calculation, the pixels of an input image are assigned to (labeled as) metapixels, wherein a metapixel is a set of all the connected pixels in an image that have the same intensity level. This forming of megapixels uses a parallel method for connected component labeling (CCL), and results in a set of catchment basins (CBs). The resulting catchment basins are connected into a graph and in a later stage into a tree. A local intensity minimum, representing a set of extremal regions is assigned to each pixel, to which said each pixel will potentially belong. An embodiment of the method includes, as the final stage, using the pixel assignments to calculate areas, stability values and MSER threshold levels for the local intensity minima.

Embodiments of the present invention includes a method of determining MSER on a processing system that includes a parallel processor such as a GPU, the method including method steps carried out in parallel. Embodiments of the present invention also include an apparatus that includes a parallel processor and that is operative to carry out the method, and also logic, e.g., executable instructions configured on a non-transitory computer-readable media operative to carry out the method, and a non-transitory computer-readable medium encoded with such instructions. The method includes assigning to the pixels in an image metapixels of all connected pixels at a level, carrying out watershed in parallel on metapixels to determine catchment basins, and carrying out further steps, including steps executed in parallel to determine the MSER of the image.

Particular embodiments include a method of operating a processing system that includes one or more parallel processors, the method is to determine MSER of an input image, and comprises:

accepting an input image;
forming metapixels from the input image;
connecting all metapixels to their corresponding local minima to determining a catchment basin for each metapixel, including carrying out a first set of operations executed in parallel on at least one of the one or more parallel processors;
identifying which of the catchment basins are connected, and connecting the catchment basins to form an MSER data structure, including carrying out a second set of operations executed in parallel on at least one of the one or more parallel processors;
determining the area of each region at each level of the MSER data structure, calculating a measure of stability and any local minimum in the calculated stability, wherein a local minimum indicates detection of an MSER.

Particular embodiments include an apparatus for determining MSER of an image, the apparatus comprising:

means for accepting an input image;
means for forming metapixels from the input image;
means for connecting all metapixels to their corresponding local minima to determining a catchment basin for each metapixel, including means for carrying out a first set of operations executed in parallel on means for computing that includes one or more parallel processors;
means for identifying which of the catchment basins are connected, and for connecting the catchment basins to form an MSER data structure, including said means for identifying and connecting including means for carrying out a second set of operations executed in parallel on said means for computing; and
means for determining the area of each region at each level of the MSER data structure, calculating a measure of stability and any local minimum in the calculated stability, wherein a local minimum indicates detection of an MSER.

In some method and apparatus versions, the determining of the catchment basins comprises carrying out watershed operations, including operations in parallel on at least one of the one or more parallel processors, using topographic distance on metapixels.

In some versions, the forming of the MSER data structure comprises building a watershed graph to identify which catchment basins are connected, wherein each catchment basin is a node in the watershed graph, and edges are ridge levels where two catchment basins are connected.

In some method and apparatus versions, the forming of the MSER data structure comprises building a watershed graph to identify which catchment basins are connected, wherein each catchment basin is a node in the watershed graph, and edges are ridge levels where two catchment basins are connected, and further comprises converting the watershed graph into the MSER data structure in the form of an MSER tree, including connecting the catchment basins into the MSER tree according to level at which catchment basins are merged.

In some method and apparatus versions, at least one of the one or more parallel processors is a GPU that has a plurality of cores that operate in parallel.

In some method and apparatus versions, at least one of the one or more parallel processors is a GPU that has a plurality of cores that operate in parallel, and the processing system includes a processing subsystem that includes one or more processing elements, wherein the combination of the GPU and the processing system are programmable using a set of programming models and related programming tools.

Particular embodiments include a processing system apparatus configured to determine MSER of an image. The apparatus comprises:
one or more parallel processors each comprising a plurality of parallel processing elements that are operative in parallel;
a processing subsystem comprising one or more host processor elements, and coupled to the one or more parallel processors, and
one or more storage elements, including at least one device memory coupled to the parallel processors, and at least one host memory coupled to the host processing subsystem.

The one or more storage elements comprise instructions that when executed by the combination of at least one of the parallel processing elements and at least one of the one or more host processor elements, cause the processing system to carry out the method steps of a method of determining MSER of an image as recited in the any of the method embodiment and versions thereof described above.

Particular embodiments include a non-transitory computer-readable medium configured with instructions that when executed by one or more parallel processors of a processing system that includes at least one parallel processors and may include a host processing subsystem, cause carrying out a method of determining MSER of an image comprising the method steps recited in any above-described method or an above-described version thereof.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

On GPUs and GPU Programming

One embodiment of the invention includes carrying out the methods on a GPU. A modern GPU is a parallel, multithreaded, multi-core processing device or part of a device, e.g., part of an application specific integrated circuit or other semiconductor chip, with high computational power and high memory bandwidth. A GPU is suitable, inter alia, for data-parallel computations, e.g., for the same program being executed on many data elements in parallel. The example embodiment described herein is based on the CUDA model that provides for a CPU (a host) coupled to a GPU to use the GPU to run multiple processing threads in parallel. Alternate embodiments use the OpenCL model which also provides such capabilities. The present invention, however, is not limited to such programming models, but simply to data-parallel computations.

FIG. 1 shows a simplified block diagram of a processing system 100 according to one embodiment of the present invention. The system includes a host processing subsystem 111 (simply "host") and a parallel processor subsystem 121 that includes one or more parallel processors, e.g., a GPU subsystem or device that includes at least one GPU 123 and its memory 125, called GPU memory, global GPU memory, and simply global memory. Only one such parallel processor 123, e.g., GPU 123 is shown in the parallel processor subsystem of FIG. 1. A parallel processor includes a plurality of cores 131, each capable of executing one floating point or integer instruction per clock cycle. The host includes at least one CPU 113 and host memory 115, and interconnections thereof. Data is usually transferred between the global GPU memory 125 and host memory 115 using programmed DMA, which can operate concurrently with both the host CPU(s) 113 and the GPU cores 131. The processing system may include one or more other elements, such as one or more other storage elements 141. Method embodiments of the invention operate on the processing system. The processing system also forms a processing system embodiment of the invention, including a non-transitory computer-readable medium embodiment that includes instructions (117 and 147) that when executed on the combination of the GPU 123 and at least one CPU 113, carry out a method embodiment of the invention. A GPU 123 includes multiple cores 131 that may be arranged in particular manners. The GPU 123 of FIG. 1 includes a plurality of multiple streaming multiprocessors 133, each streaming multiprocessor 133 ("SM", or "SMX", hereinafter "SM") comprising a number, e.g., 32 cores or 192 cores, arranged as groups, e.g., 32 cores as two groups of 16 cores. Each core 131 is capable of execute one floating point or integer instruction per clock cycle. The cores 131 may execute in what NVIDIA calls SIMT (single instruction, multiple thread) fashion, according to which all cores in the same group execute the same instruction at the same time, much like classical single instruction multiple data (SIMD) processors. SIMT handles conditionals somewhat differently than SIMD, though the effect is much the same, where some cores may be disabled for conditional operations. In some versions, each SM 133 has a fast cache 135 shared amongst its cores 131, which is used in the CUDA framework as so-called shared memory and shared cache memory. Each SM 133 may also have a special function unit (not shown). The GPU may also have a host interface 127 to the host processing system 111 and a thread scheduler 129.

In NVIDIA's CUDA framework, as well as in the industry-standard OpenCL framework, the computational elements of algorithms are known as kernels. An application or library function may include one or more kernels. Kernels can be written, for example, in the C language (or other languages), extended with additional keywords to express parallelism directly rather than through looping constructs. Once compiled, kernels include many threads that execute the same program in parallel. A single thread can be thought of as one iteration of a loop. When processing a picture of pixels, for example, one thread may operate on one pixel, while all the threads together—the kernel—may operate on a whole image.

In CUDA, multiple threads are grouped into thread blocks containing up to a large number, e.g., thousands of threads. All of the threads in a thread block are meant to run on a single SM, so within the thread block, threads can cooperate and share memory. Within each block, threads share data via the shared cache memory 135 of each SM 133, which is realized by very fast on-chip cache memory in the GPU. Such shared data in one block (one SM) is not visible to threads in other blocks.

Blocks are typically small (e.g., 16×16 threads). All threads have access to global GPU memory. The host also has access to global GPU memory. The multiple threads of a single block can have synchronized execution, in order to achieve hazard-free memory access.

Thread blocks may be grouped into grids, each of which executes a unique kernel.

Communication of threads from different blocks is carried out over global GPU memory 125 using so-called atomic operations in which any thread of any grid can atomically update any location in global GPU memory 125 or shared cache memory 135. An atomic operation performs a read-modify-write atomic operation on one word residing in global GPU memory or in shared cache memory. There are atomic operations provided in CUDA for the following operations on signed/unsigned integers: add, sub, min, max, and, or, xor, increment, decrement, exchange, compare and swap. These atomic operations involve locking the memory location during the execution.

However, any atomic operation, e.g., atomicADD, etc, can be implemented in CUDA using the unsigned atomic Compare and Swap (atomicCAS) operation. The instruction:

unsigned int atomicCAS(int *address, int compare, int val)

carries out the following three operations (while locking access the contents of address address: reading old located at the global GPU memory address address; computing (old==compare?val: old); and storing the result back at the same address. The three operations are performed in one atomic transaction. The function returns old One of the operations that used in embodiments of the invention includes enumerating and assigning identifiers. Consider an input on which subsequent computations are to be done on a small subset of input satisfying a certain property. A first programming method of carrying this out includes spawning a thread for each object and detecting the certain property inside each thread. A second programming method includes enumerating and labeling all the objects that satisfy the certain property and spawning a thread for each of such object. The second method clearly requires a (much) smaller number of threads spawned than the first. Enumerating and labeling can be achieves using the CUDA atomicAdd operation, which is particularly suitable, it returns old value of the sum, such old value as the label of the object.

Definition of MSER

An MSER feature detector is informally explained in Matas_2002 as follows. Imagine all possible thresholdings at different intensities of a multi-level image I. Consider an ordered sequence of binary images caused by thresholding at different increasing threshold levels, e.g., threshold t=0, 1, 2, . . . , 255. One can refer to the pixels of a binary image below a threshold t as 'black' (intensity value or 0) and to those above or equal the threshold as "white." If one views the each binary image of the ordered sequence in order, i.e., starting with threshold 0, then increasing to 1, then 2, etc., one would see first a white image. Subsequently black spots corresponding to local minima in the image will appear and grow as the threshold level (the image index) t increases. At some point regions corresponding to two local minima will merge. Finally, the last image will be black. The set of all connected components of all binary images of the sequence for an input image I is the set of all maximal regions. Minimal regions may be similarly obtained by first inverting the intensity of I and running the same process.

In many images, the local binarization is stable over a large range of thresholds levels t in certain regions of the image, called maximal region. Such regions are widely applicable since they possess such desirable properties as invariance to affine transformation of image intensities; covariance to adjacency preserving (continuous) transformations on the 2-D image domain; stability, since only extremal regions whose support is virtually unchanged over a range of thresholds is selected; and multi-scale detection: since no smoothing is involved, both very fine and very large structure is detected.

Another informal explanation is: consider an "empty" image with all the intensity values at the pixels locations removed, e.g., set to 0 for 0 being black and 255 adding pixel intensity values to their respective positions, one intensity value at a time, in ascending order to 1, then to 2, then 3, . . . , up to 255. During this process, local minima of intensity values threshold levels may appear, and the regions of pixels surrounding such minima will grow from such minimum intensity levels. For each such region growing around a local minimum, there is a rate of growth q(i), called the stability, as a function of the intensity value i. A maximally stable extremal region is detected at a threshold level i* if and only if the rate of change of the size, e.g., area of the region when the pixels of $2\Delta$ intensity levels around i* are added achieves a local minimum, where $\Delta$ is parameter of the MSER feature detector.

A formal definition of MSER was introduced in Matas_2002 as follows. Let image I be a mapping I from two-dimensional (2D) image space, denoted D, e.g., the possible 2D pixel locations within an image, to the space S of values, e.g., pixel values. In the example described herein, $S=\{0, 1, \ldots, 255\}$, with 0 representing black. In general extremal regions are well defined on images if S is totally ordered, as it is in the example of an integer valued image, and an adjacency (also called "connectivity") relation A, $A \subset D \times D$ is defined, where xAy denoted element x is connected with element y according to the connectivity relationship A. In Matas_2002 and the example embodiments of the present invention, 4-connectivity only is considered.

In general extremal regions are well defined on images if S is totally ordered, as it is in the example of an integer valued image, and an adjacency (also called "connectivity") relation $A \subset D \times D$ is defined, where xAy denoted element x is connected with element y according to the connectivity relationship A. In Matas_2002 and the example embodiments of the present invention, 4-connectivity only is considered.

A region Q is a contiguous subset of D (called a connected region, or contiguous region) if for each p,q in region Q, e.g., for each pair of pixels within the region, there exists a sequence of $n \geq 0$ connected elements, $\{a_i\}$, $i=1, \ldots n$, e.g., n pixels, that connect to p and q, with $a_1$ the element having a connectivity relationship with p, ($a_2$ with $a_1$), . . . , ($a_{i+1}$ with $a_n$), . . . , and ($a_n$ with q), with n=0 meaning that p and q have a connectivity relation. That is, region Q is contiguous if there is a path of connected pixels in the region between any two pixels in the region.

An (outer) region boundary of a contiguous region Q, denoted by $\partial Q$ is defined as the set of all elements $\{q\}$ in image space D but not in Q, there exists an element p in Q such that aAp, i.e., having an adjacency relationship with the element q of $\partial Q$. Thus, boundary $\partial Q$ of region Q is the set of pixels adjacent to at least one pixel of Q but not belonging to Q.

An extremal region Q in D is a region such that either it is a maximum intensity region in that, for all pairs of p in Q and q in $\partial Q$, the intensity of (pixel) p is more than the intensity of (pixel) q, i.e., $I(p)>I(q)$, or it is a minimum intensity region in that, for all pairs of p in Q and q in $\partial Q$, the intensity of (pixel) p is less than the intensity of (pixel) q, i.e., $I(p)<I(q)$.

Let $\{Q_i\}=Q_1, Q_2, \ldots, Q_i, Q_{i+1}, \ldots$ be an ordered sequence of nested extremal regions, such that $Q_i \subset Q_{i+1}$, wherein the indices are index intensity values that can occur in an image. In the example embodiment described herein, an extremal region $Q_{i*}$, the region at index i* is a maximally stable extremal region (MSER) at level i* if and only if the rate of change, denoted q(i) of the size of $Q_i$, denoted $|Q_i|$, e.g., rate of change of the area of region $Q_i$ from $|Q_{i-\Delta}|$ to $|Q_{i+\Delta}|$ has a local minimum at i*, where $\Delta$ is a parameter.

Recalling that $Q_i \subset Q_{i+1}$, formally, $q(i)=|(Q_{i+\Delta}\backslash Q_{i-\Delta}|/|Q_i|$, and is called the stability level at intensity i.

Figure 2:
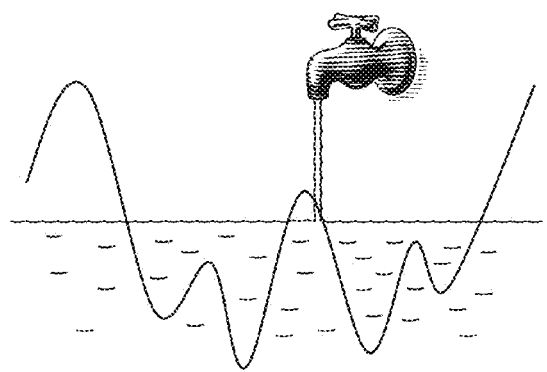
FIG. 2 shows a watershed analogy for a method used in an embodiment of the present invention, in which analogy the levels (intensities) of the pixels in an image are imagined as a landscape height-map.

One standard method for computing MSER of an image follows the same process as a very popular flooding simulation algorithm for determining watershed segmentation, a well-known method of segmentation. FIG. 2 shows a watershed analogy, in which the levels (intensities) of the pixels in an image are imagined as a landscape height-map. The water level is raised gradually until the whole landscape is immersed. In typical prior-art watershed segmentation methods, the level is raised equally at all places in the landscape (image). That is, one either thinks of the landscape as porous so that the water level will be equal everywhere, or equivalently, imagines that a hole is pierced in each local minimum of the landscape, allowing water to enter. A typical prior-art watershed method keeps tracks of the connected components of "water," i.e., connected components of pixels, using a union-find data structure with path-compression.

Example Method and System for Parallel MSER Detection
Some Definitions

A metapixel at level L is defined as a connected region Q with the property that for all elements, e.g., pixels that belong to Q, e.g., element p of Q, the intensity I(p)=L and for all elements pixels that belong to the (outer) region boundary, $\partial Q$ of Q, e.g., element q the intensity I(q)≠L. Thus, a metapixel is a connected component of pixels with same intensity level. L is called the intensity of the metapixel.

Let D' denote all metapixels D' from an image I. An adjacency relationship (also called connectivity relationship), denoted A' between two metapixels in D', e.g., $Q_1$ and $Q_2$ each in D', denoted $Q_1 A' Q_2$ is said to exist if and only if for all elements $p_1$ belonging to $Q_1$ and for all elements $p_2$ belonging to $Q_2$, element $p_1$ has an adjacency relationship with $p_2$, i.e., $p_1 A p_2$.

A sequence of nested extremal regions (SNER) is an ordered sequence of a number, say n of metapixels, |$\{Q_i\}=Q_1, Q_2, \ldots Q_n$, with
 a) $Q_i \subset Q_{i+1}$,
 b) the first metapixel, $Q_1$ having the property that none of its subsets is an extremal region, so that $Q_1$, called the seed of an SNER, is a metapixel having a local intensity minimum from which the SNER $\{Q_i\}$ expands, and
 c) $Q_n$, the last metapixel being an extremal region of the SNER, in that at $Q_n$, the SNER ceases to exist either because $Q_n$ represents entire image I or because $Q_n$ is merged to another SNER.

Labeling Connected Pixels

Since all pixels from a metapixel belong to the same extremal region, one feature of one embodiment of the present invention includes assigning metapixel to all connected pixels that have the same level. Another feature of one embodiment of the present invention is that once metapixels are assigned, all further computations are carried out on metapixels using the metapixel adjacency relation A'.

In one embodiment of the present invention, the assigning (labeling) of pixels of an image to connected components—metapixels—according to intensity level uses a parallel implementation of a method for connected component labeling (CCL). A particular embodiment of the invention use a parallel CCL method based on the methods described in detail by K. A. Hawick, A. Leist, and D. P. Playne. "Parallel graph component labeling with GPUs and CUDA." Parallel Computing Vol. 36, No. 12, pp. 655-678, 2010. Section 5 describes CCL on two-dimensional hypercubic mesh graphs, and several algorithms for GPU implementation are provided. One embodiment of the present invention uses a multi-pass method that operates by labeling connected components over multiple iterations. Such a method usually performs some local neighbor operations in the form of setting the label of an element to the lowest label of the neighbors or recording equivalences between two labels.

In order to compute MSER, area values of all intensity levels of every SNER are determined. To compute areas of metapixels in an SNER, each metapixel adds its area to the corresponding SNERs at that metapixel's intensity level. Considering this, a metapixel is assigned to one or more SNERs that will contain that metapixel. There are three ways a metapixel denoted M can be assigned to an SNER:
 1. In the case there are no metapixels adjacent to M having a lower intensity level than M, M is local intensity minimum and therefore assigned as the seed of an SNER
 2. In the case that metapixels that are adjacent to M and that have respective lower intensity levels are assigned to a single particular SNER, M also is assigned to that particular SNER.
 3. In the case that metapixels that are adjacent to M and that have respective lower intensity levels are assigned to a plurality of different SNERs, one SNER of the plurality is selected as a parent SNER, other SNER are merged into the parent so cease to exist as distinct SNERs, and M is assigned to the selected parent SNER. In some embodiments of the invention, the selecting of a parent SNER is according to one or more pre-defined criteria. In one example embodiment, the SNER of the plurality that has the smallest seed level is selected as the selected parent SNER.

In one embodiment of the present invention, the process of assigning metapixels to SNERs is carried out using a new method of determining watershed in parallel, e.g., on a GPU, e.g., using CUDA. The new parallel method uses a topographic distance for the watershed calculation. The watershed determination is rapid not only because of being parallel, but also because it works on metapixels rather than pixels. According to one definition of watershed (for pixels), each pixel is labeled with a minimum which lies at the end of a path of steepest descent. It is then said that the pixel lies at the catchment basin (CB) of the minimum. Considering this, after determining the metapixels of an input image, one embodiment of the present invention includes determining watershed by topographic distance on the determined set of metapixels, resulting in a set of catchment basins.

In order to efficiently determine to which SNER a metapixel is assigned to, one embodiment of the invention includes representing the set of catchment basins determined by watershed as a graph and then forming a tree, called an MSER tree from the graph. The MSER tree represents how catchment basins are merged. In particular, in the tree, if a catchment basin denoted A is a parent of a catchment basin B with the edge value 1, then catchment basin B ceases to exist at level 1 and it is merged to catchment basin A. Each metapixel can traverse the tree, starting from its catchment basin, until it reaches edge greater than its intensity level, finishing at the corresponding SNER.

An Overview of an MSER Detection Method Embodiment

Figure 3:
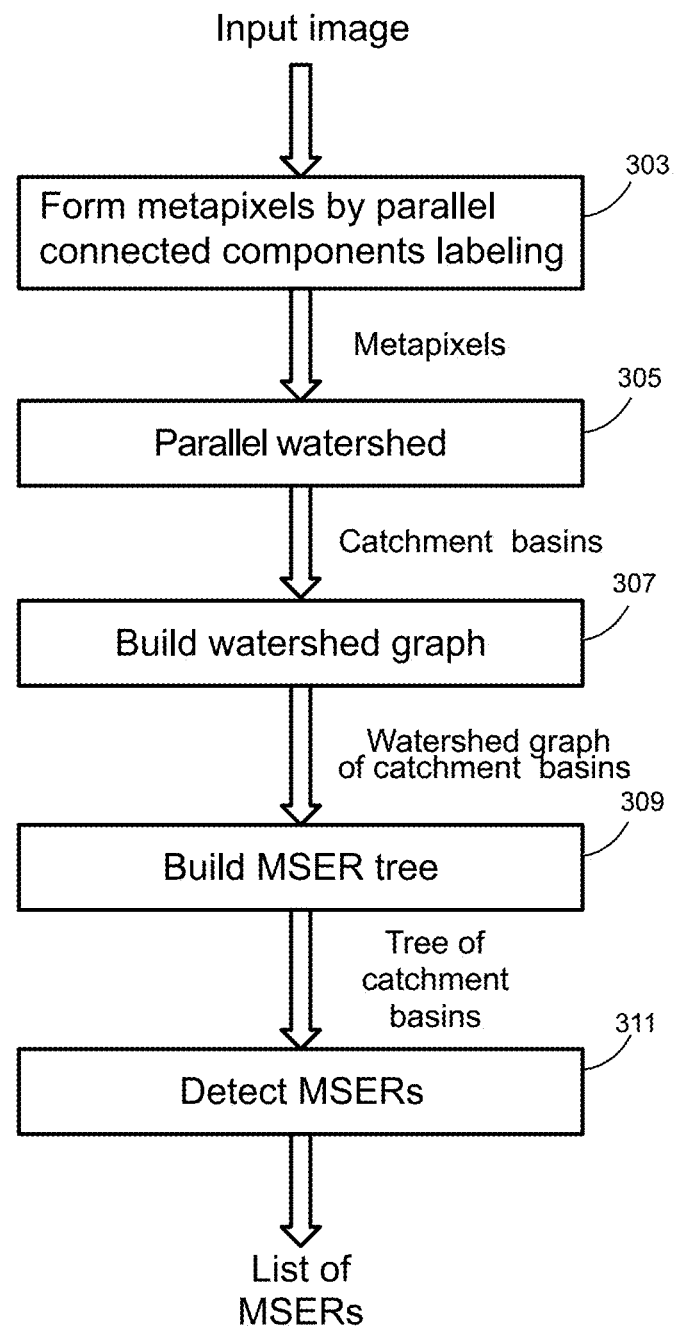
FIG. 3 shows a simplified flow diagram of an embodiment of the invention

FIG. 3 shows a simplified flow diagram of an embodiment of the invention that includes
 Accepting an input image.
 In 303, forming metapixels from an input image, e.g., by labeling all connected pixels having a particular level as a metapixel, using a parallel CCL method.
 In 305, computing watershed in parallel, e.g., by topographic distance on metapixels, resulting in a catchment basin being assigned to each metapixel. This connects all metapixels to their corresponding local minima, resulting in catchment basins.

In 307, building a watershed graph to identify which catchment basins are connected, wherein each catchment basin is a node in the watershed graph, and edges are ridge levels where two catchment basins are connected.

In 309, building an MSER tree from the watershed graph, comprising connecting the catchment basins into the MSER tree of catchment basins, according to level at which they are merged.

In 311, detecting the MSERs including calculating the areas of each region at each level of the MSER tree, calculating stability (rate of grown) and any local minimum in the calculated stability, each such local minimum indicating detection of a respective MSER. The result is a list of MSERs.

Parallel Watershed by Topographic Distance (Process 305 of FIG. 3)

Figure 4:
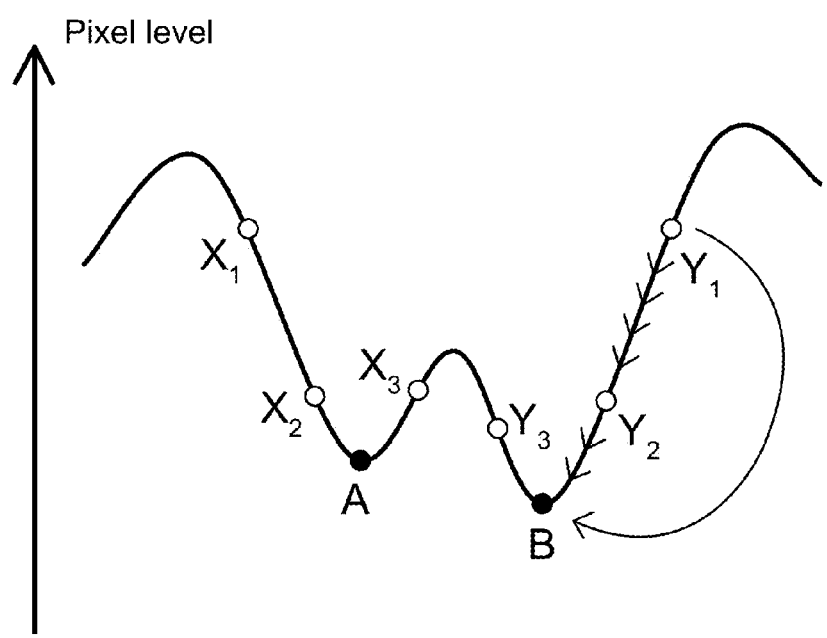
FIG. 4 shows a one-dimensional example of an image with catchment basins to explain a feature of an embodiment of the invention.

Intuitively, a drop of water falling on a topographic relief flows towards the "nearest" minimum. The "nearest" minimum is that minimum which lies at the end of the path of steepest descent. In terms of topography, this occurs if the point lies in the catchment basin of that minimum. FIG. 4 shows a one-dimensional image, where A and B represent catchment basins, points X1, X2 and X3 fall into catchment basin A, and points Y1, Y2 and Y3 fall into catchment basin B. The arrow from Y1 to B follows the path of steepest descent.

Figure 5:
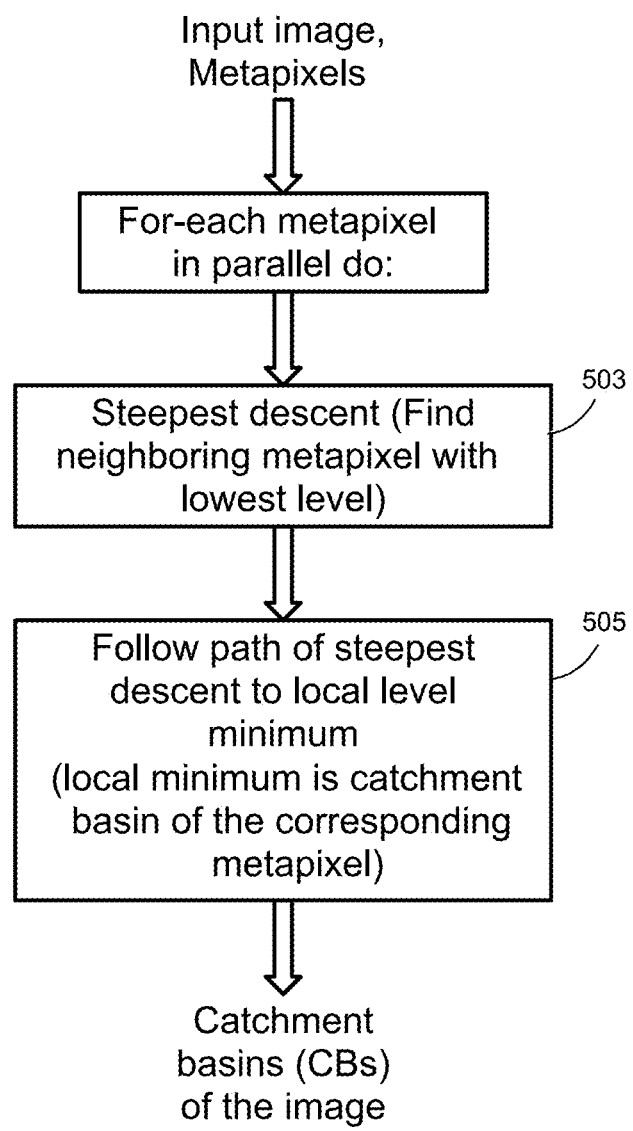
FIG. 5 shows a flow diagram of one embodiment of a parallel method used in an embodiment of the invention.

The aim of standard watershed algorithm is to label each pixel of an input image with an identifier of the catchment basin to which it belongs. In the watershed method of the present invention, each metapixel rather than pixel is labeled. FIG. 5 shows a flow diagram of one embodiment of the parallel method described herein, After an input image's metapixels are accepted, the method includes two steps, each carried out in parallel for each metapixel:

In 503, finding steepest descent. For each metapixel, the step finds a neighboring metapixel with the lowest intensity level that is lower than metapixel's intensity level, such a neighboring metapixel called the minimal neighbor of the metapixel. If there is no minimal neighbor, the metapixel is a local intensity minimum.

In 503, following the path of steepest descent. For each metapixel, the step traces the path of steepest descent until it reaches a local minimum. The metapixel is labeled with the reached local minimum.

For step 503, parallelism is achieved over each pixel of the image. If a pixel is on border of two metapixels, step 503 includes updating a minimal neighbor of a parent metapixel. Since more than one border pixel may try to update a minimal neighbor, atomic operations are used for the updating. In particular, one embodiment of the present invention uses an atomic compare and swap operation provided in CUDA, atomicCAS, which changes the contents of a memory location atomically if the content of the location equals some value.

FIG. 6 shows pseudocode for a parallel method of carrying out watershed based on the topographic distance in accordance with aspects of an embodiment of the present invention.

Building the Watershed Graph (Process 307 of FIG. 3)

A watershed graph is an undirected graph in which each node represents a catchment basin, and which identifies which catchment basins are connected. Nodes have weights and edges in the graph exist between any two connected catchment basins, and have respective edge weights that are the minimum ridge levels where the two catchment basins are connected.

The following definitions are applicable to the graph, in which the set of all nodes V represents the set of all catchment basins:

Nodes in the graph represent catchment basins (CBs). A node representing a CB, denoted by v, is in the set V of all nodes.

Ridge metapixels are metapixels on the border of a CB. A Ridge is a pair of two neighboring metapixels that belong to different CBs. That is, denote by $Q_1$ and $Q_2$ two metapixels and let nodes $v_1$ and $v_2$ represent two CBs. Metapixels $Q_1$ and $Q_2$ form a ridge between $v_1$ and $v_2$ if and only if $Q_1$ is in the CB of $v_1$, $Q_2$ is in the CB of $v_2$, and $Q_1 A' Q_2$ (metapixels $Q_1$ and $Q_2$ are connected). A Ridge level is defined as the larger of the two metapixels that form the ridge.

A Node level or node weight is the local minimal level of the CB represented by the node.

CBs are connected if they are neighbors in the input image, or if they share a ridge.

Edges in the graph exist between connected CBs, and have edge weights. The set of all edges, denoted E, is defined as follows: a pair of nodes $v_1$, $v_2$ is an edge (i.e., is in E) if and only if there exist a pair of metapixels $Q_1$ and $Q_2$, each in the set D' of all metapixels of an image, such that $Q_1$ is in the CB of $v_1$, $Q_2$ is in the CB of $v_2$, and $Q_1 A' Q_2$, i.e., metapixels $Q_1$ and $Q_2$ are connected. Thus, each node (CB) has a set of edges, and there is an edge of a particular node for each other node (CB) with which the particular node is connected.

The weight of edge (edge weight) between a pair of nodes $(v_1, v_2)$ is the minimum ridge level of all ridges that connect two CBs, i.e., the lowest level at which two catchment basins meet.

Figure 7:
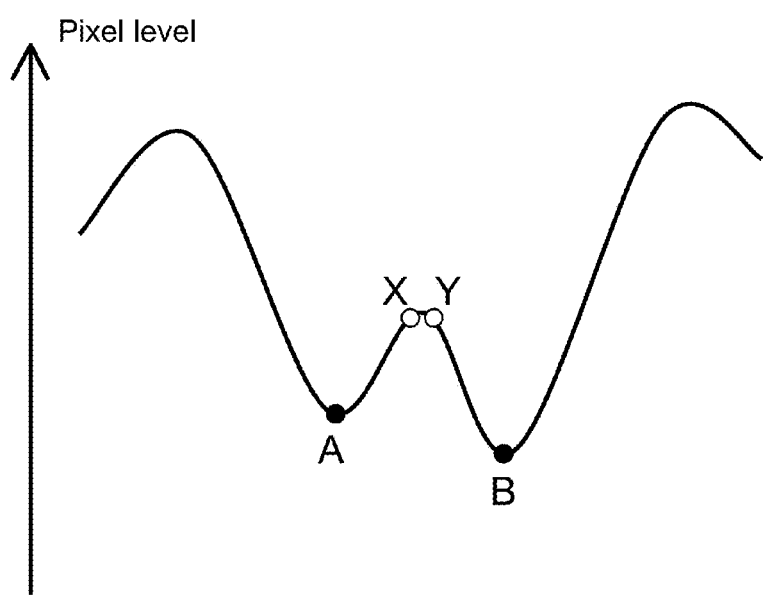
FIG. 7 shows a one-dimensional example of an image with a ridge, ridge metapixels, and catchment basins.

FIG. 7 shows a one-dimensional example of a ridge and ridge metapixels. A, B are catchment basins. In the drawing, X and Y are ridge metapixels and the (X,Y) pair forms a ridge that connects the catchment basins A and B.

In one embodiment, the watershed graph is represented by an adjacency list of nodes, where for each node of the adjacency list, edges of the node are connected as a linked list of edges between the node and other nodes. In one embodiment, each edge in the linked list of edges of a node has four values:

1. curCb. Represents the current node (current CB), i.e., the node (CB) to which the linked list of edges belongs.
2. adjCb. Represents the adjacent CB, i.e., the node which is connected to the current node.
3. edgeWeight. Represents the weight of the edge i.e., the intensity level at which two catchment basins meet.
4. next. This is a pointer to the next edge in the linked list. A pre-defined value, e.g., next=−1 indicates the last node in the list.

Note that it is not known in advance how many neighbors one catchment basin might have. Furthermore, two catchment basins may be connected through multiple pixels and the edge weight selected among these.

Figure 8:
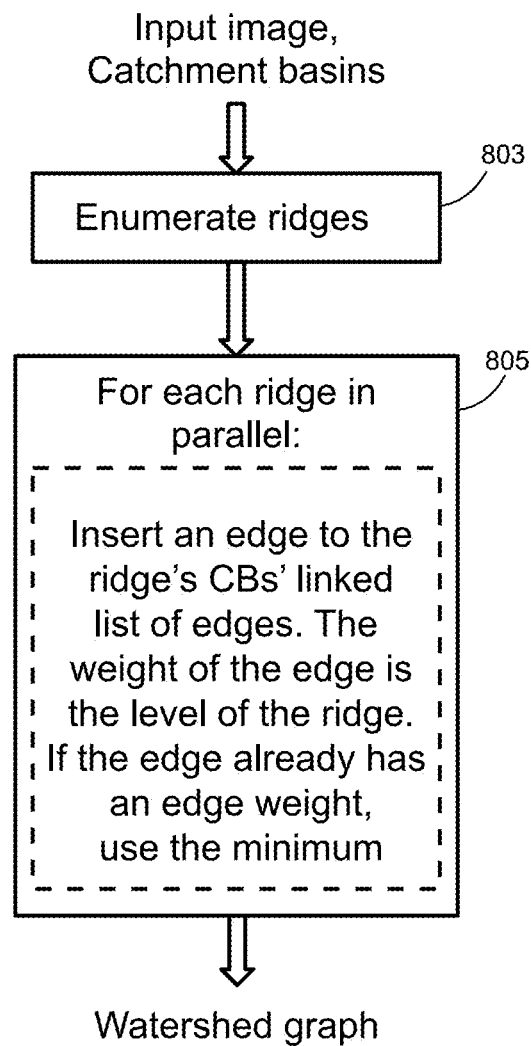
FIG. 8 shows a simplified flow diagram of an embodiment of building a watershed graph used in one embodiment of the present invention.

FIG. 8 shows a simplified flow diagram of an embodiment of building the watershed graph. One embodiment of the present invention includes building the watershed graph in two steps:

In 803, enumerating ridges and their nodes. Because each node of the graph corresponds to a catchment basin, per the definitions above, in one embodiment, enumeration of ridges is carried out over local intensity minima.

Each metapixel of a CB that has at least one neighboring metapixel in a different CB is enumerated as a ridge.

In 805, connecting ridges to linked lists of edges. The method includes in one embodiment, for each ridge, in parallel: inserting an edge to each linked list of edges of each CB of the ridge. This is done, for each CB of the list, initially creating an empty list for the CB. Each ridge tries to connect itself to the linked list edges of its current catchment basin. This is done by iterating through the current CBs linked list of edges, and if no edge element is found with the same adjCb, adding the edge element atomically to the end of the list, otherwise the minimum of two edge weights is calculated atomically. The weight of the edge is the level of the ridge. If the edge already has and edge weight, use the minimum Building the MSER Tree (Process 309 of FIG. 3)

One embodiment of the invention includes in 309 building an MSER tree from a watershed graph. The watershed graph, recall, indicates, for each catchment basin (node), any CBs (nodes) that are its neighbors. In accordance with one embodiment of the present invention, the MSER tree provides information about how CBs are merged into one another, so that some cease to exist.

In one embodiment a, MSER tree has following properties:

The nodes of the MSER tree are nodes from the watershed graph, thus represent CBs, and the node level, denoted L of a node is, as in the watershed graph, the local minimal level of the CB represented by the node. An MSER tree discloses now nodes merge.

Node A is parent of node B with weight L if and only if node B ceases to exist at node level L and is merged into A.

Figure 9:
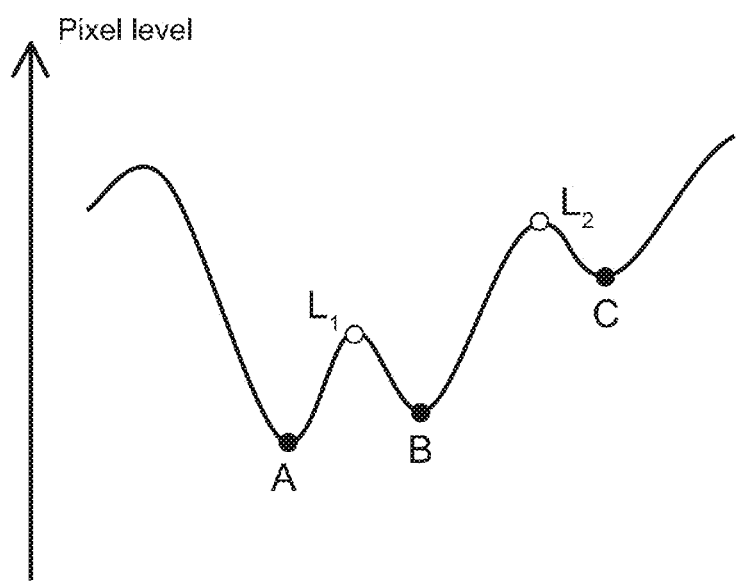
FIG. 9 shows merging of catchment basins (nodes) in accordance with an embodiment of the invention.

FIG. 9 illustrated the merging of catchment basins (nodes) in accordance with an embodiment of the invention. A, B and C are CBs (nodes of the tree); node B is merged to node A at level $L_1$; and node C is merged to node A (with B merged) at level $L_2$. A catchment basin is always merged into one of lower level.

Figure 10:
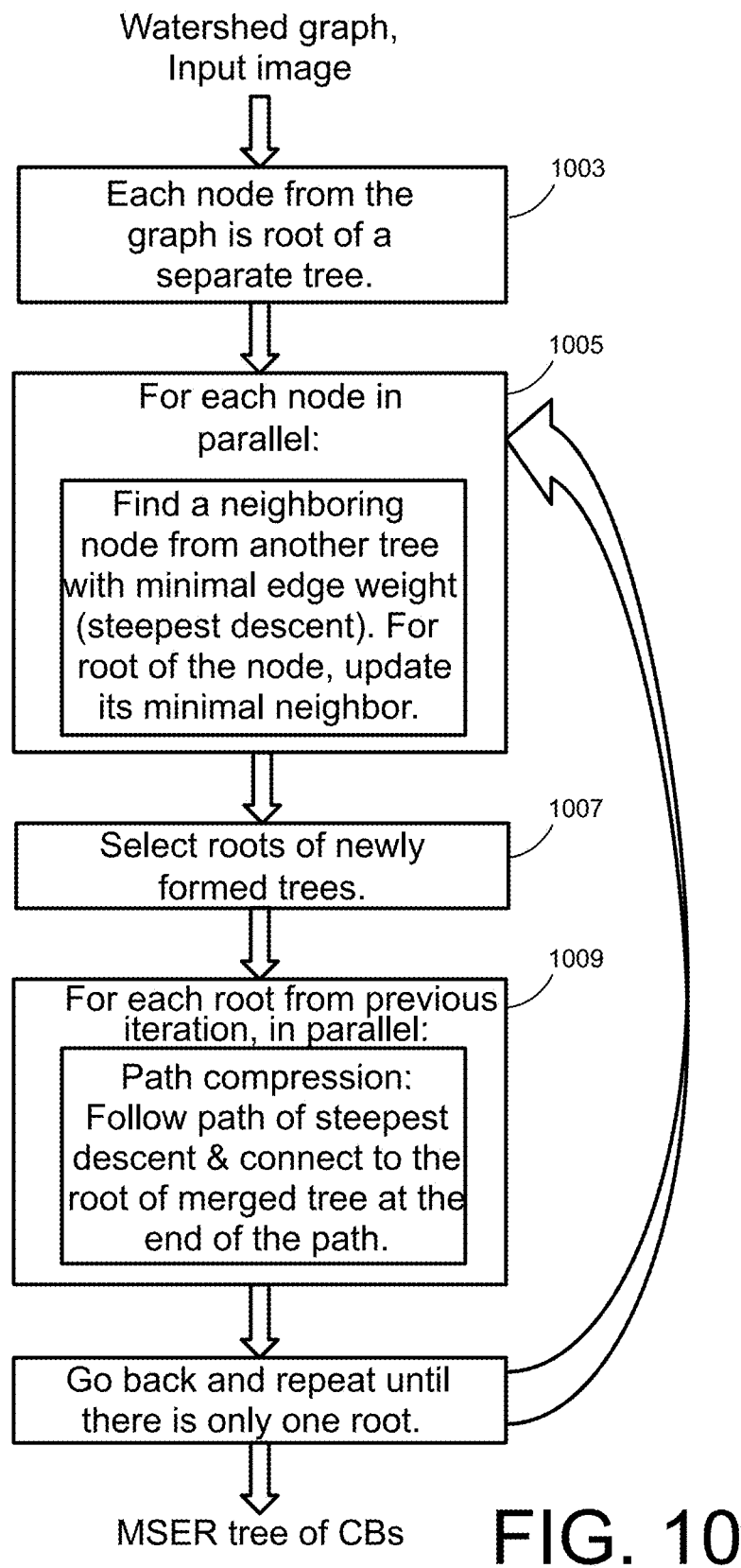
FIG. 10 shows a flow diagram of one embodiment of a method of determining the MSER tree from the watershed graph.

FIG. 10 shows a flow diagram of one embodiment of a method of determining the MSER tree from the watershed graph. At first, the method creates (1003), for each node of the MSER graph, a separate tree having as its root just the one graph node. Thereafter, the method carries one or more iterations of steps 1005 and 1007, typically several iterations, until a single MSER tree results.

In one embodiment, each iteration comprises steps 1005, 1007, and 1009. Step 1003 includes finding so-called minimal neighbors, including, for each node, in parallel, finding a neighboring node from another tree with minimal edge weight per steepest descent. This includes iteratively traversing all of said each node's edges in the watershed graph. The method only considers edges of a particular node that connect the particular node to a BC (a node) of a different tree, i.e., a node with a different root, and determines such an edge that has minimal edge weight.

Minimal neighbors of the current root are then updated using what we call "atomic update." FIG. 11 shows an example pseudocode of atomic update. In one version, when two edges have the same weight as minimal is chosen the one with lower label.

Thus, for each node of each tree, in parallel, 1005 includes finding a neighboring node from another tree connected with minimal edges, and updating the root of the node.

Step 1007 includes selecting new roots. For each node, 1007 includes determining whether said node is a root node of newly formed tree. Parallelization is achieved over all nodes (CBs). When two CBs that were roots at a previous iteration are minimal neighbors to each other, the method selects for the (new) root the CB that has the lower level.

Step 1009 carries out what is called path compression and includes connecting old roots to new roots. At a present iteration, for each root node from the previous iteration, the method follows a path of steepest descent and connects the previous-iteration's roots to the root of trees that have been merged. Parallelization is achieved over all CBs, but the operation is only carried out for nodes that are roots of trees from the previous iteration.

Figure 12A:
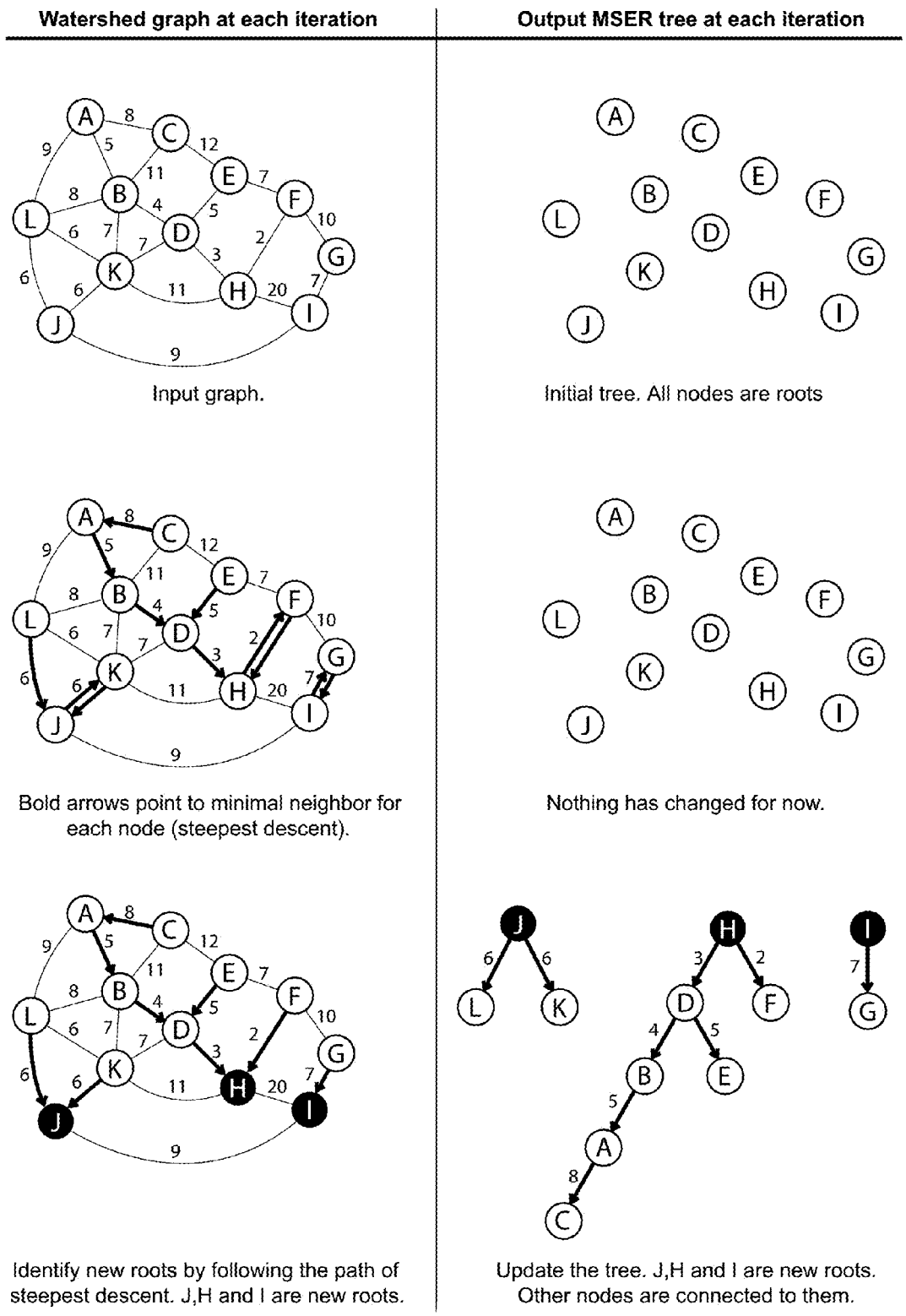
Figure 12C:
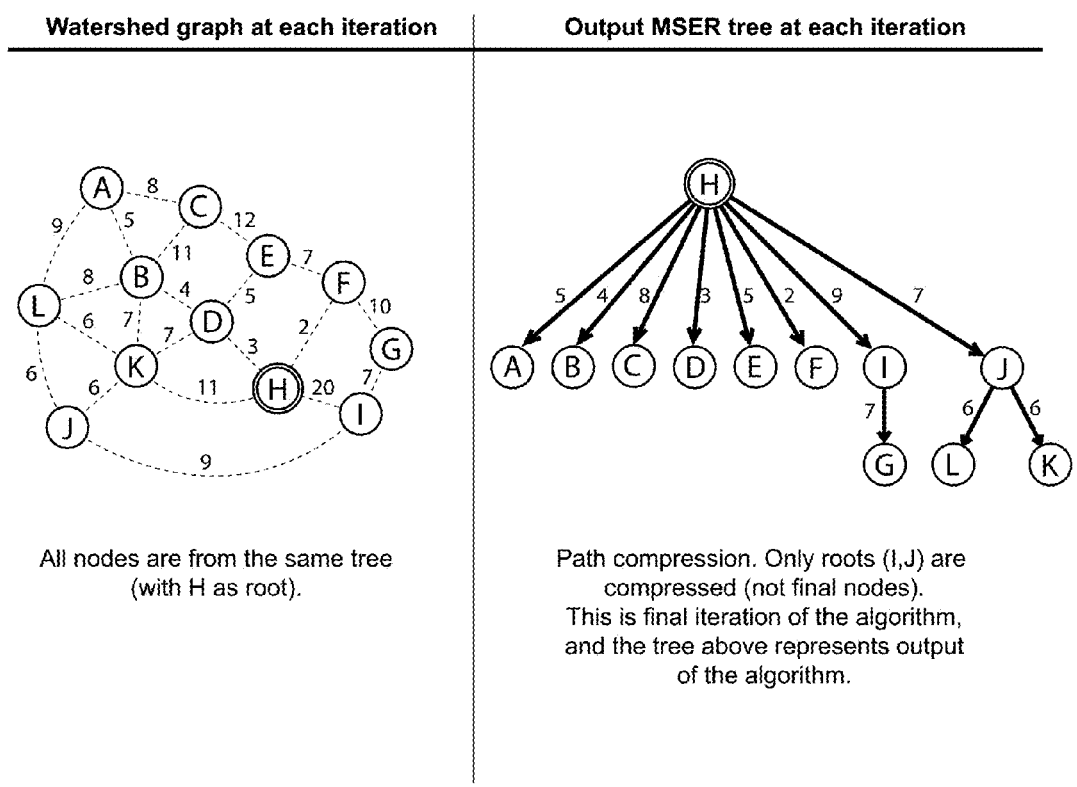

FIGS. 12A, 12B, and 12C illustrate the flow of the method on an example watershed graph. Each drawing shows on the right column the resulting tree or trees after some of the three steps 1005, 1007, and 1009 of one of the iterations, and on the left column, the corresponding watershed graphs. FIG. 12A shows the start of the three steps of the first iteration for the input watershed graph shown with nodes A, B, ..., J, K, with edges and their weights. As can be seen, already in FIG. A, there are only three trees (sub-trees) generated from the graph. FIG. 12B shows the path compression step 1009 of the first iteration (on top), at the end of which are three sub-trees. The second iteration starts in the middle row wherein only edges of between the nodes of different sub-trees are processed to find minimal neighbors between the roots of the sub-trees. Step 1007 of the second iteration identifies new roots by following the path of steepest descent, and as a result, only one root, H, is left, as illustrated in FIG. 12B. FIG. 12C shows the path compression step 1009 of the second iteration, at the end of which, per the graph, all nodes are from the same tree with H as the root. On the right hand side is the result MSER tree.

MSER Detection (Process 311 of FIG. 3)

Figure 13:
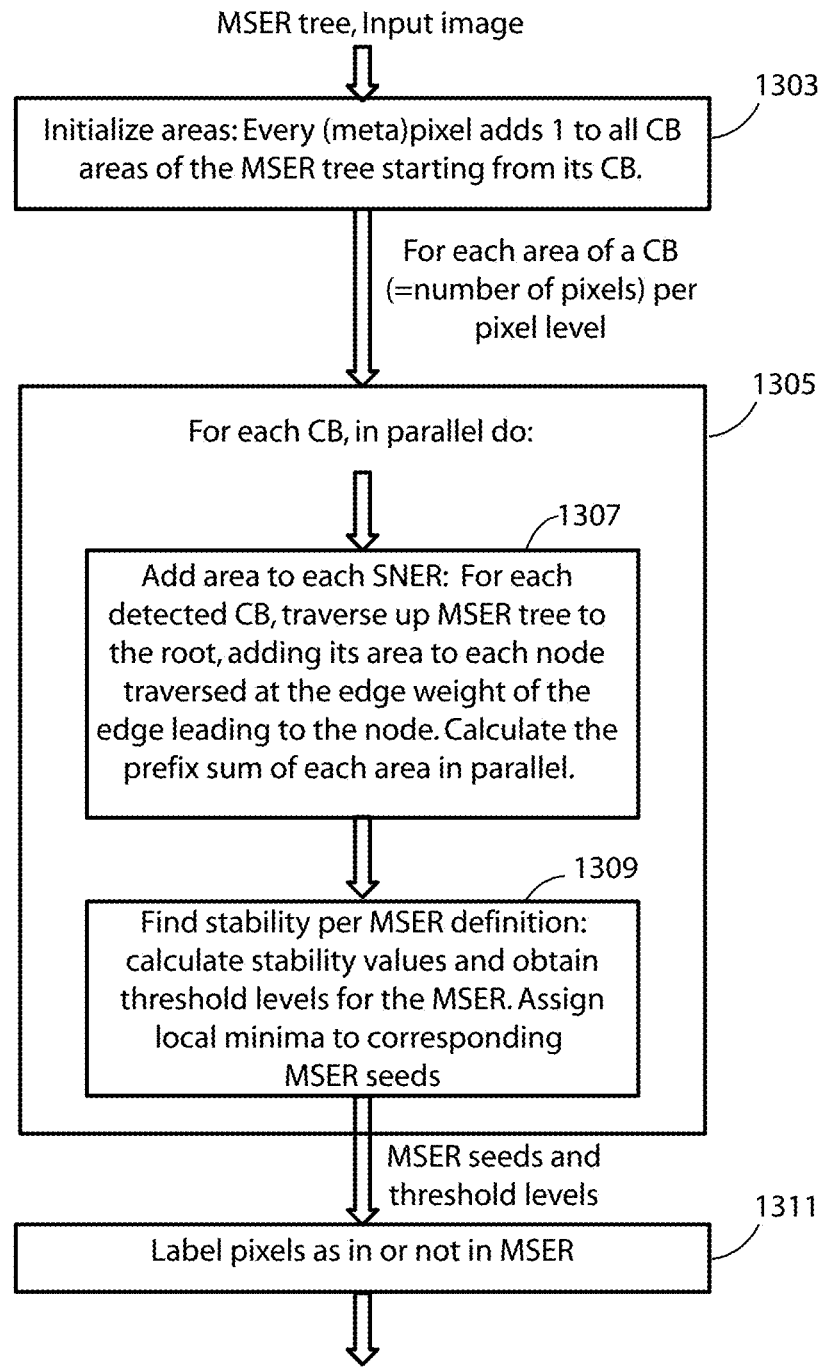
FIG. 13 shows a flow diagram of an embodiment of method steps for detecting MSER that is used in one embodiment of the present invention.

FIG. 13 shows a flow diagram of an embodiment of method steps for detecting MSERs that is used in one embodiment of the present invention. The method starts in 1303 with an "Initialize areas" process in which for every pixel, starting from the pixel's (or metapixel's) CB, each (meta)pixel adds 1 to all CBs in its MSER tree at the level of the (meta)pixel. In more details, each metapixel adds its area to the appropriate seed at the intensity level of the metapixel. Each megapixel also adds its area to the all parents in the MSER tree at the level a child node is merged into a parent node.

Figure 14:
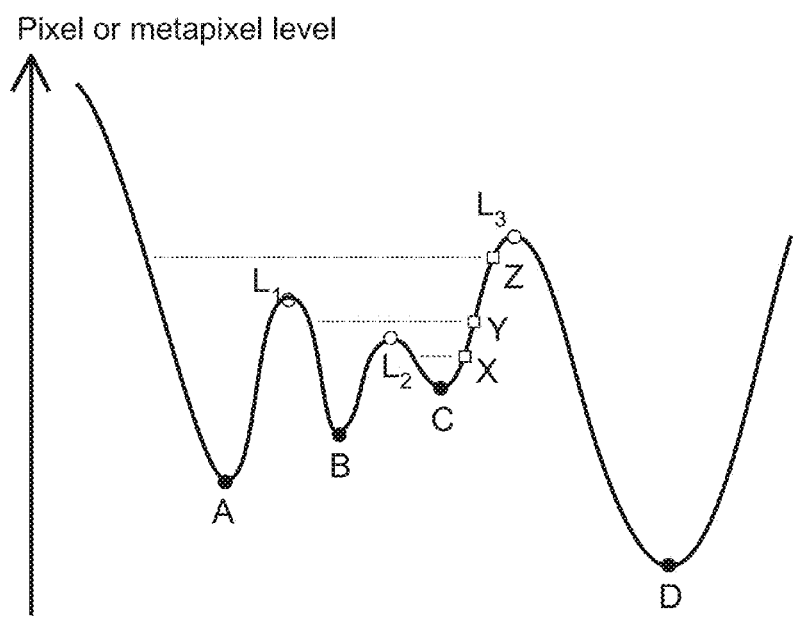
FIG. 14 shows an example of an "initialize areas" process carried out on a one-dimensional example, in accordance with an embodiment of the invention.

FIG. 14 shows an illustrative example of this "initialize areas" process 1303 carried out on a one-dimensional example in which A, B, C, and D are CBs, X, Y and Z are pixels or megapixels, and $L_1$, $L_2$, and $L_3$ are levels.

From the drawing:

Pixel X adds 1 to:
  Catchment basin C at level X,
  Catchment basin B at level $L_2$,
  Catchment basin A at level $L_1$, and
  Catchment basin D at level $L_3$.
Pixel Y adds 1 to:
  Catchment basin B at level Y,
  Catchment basin A at level $L_1$, and
  Catchment basin D at level $L_3$.
Pixel Z adds 1 to:
  Catchment basin A at level Z,
  Catchment basin D at level $L_3$.

The remaining steps of carried out on the example of FIG. 14 are self-explanatory.

In more detail, the detecting MSER portion 311 of the example embodiment includes determining threshold levels for each seed of an SNER that is an MSER.

Recall, an SNER is a sequence of megapixels, starting from a first megapixel, the seed of the SNER,—a metapixel having a local intensity minimum from which the NSER (in this case, an MSER) expands. In order carry this out, areas and stability values are needed calculated for each seed across intensity levels. Each seed can compute a lower and upper bound of its SNER existence. A lower bound represents the metapixel level at which an SNER starts to grow; an upper bound the represents the metapixel level where SNER ceases to exist, with the SNER and merged into another SNER, and a lower bound is the intensity level of the seed, and the upper bound is the weight of the edge pointing to the parent in the MSER tree. One embodiment of the invention creates a data structure, called a seed array, with size (lowerBound-upperBound) whose elements represents the sizes (area values) across intensity levels between lowerBound and upperBound. Each metapixel adds its area to the appropriate seed at the intensity level of the metapixel. Of course, those skilled in the art would understand that in alternative embodiments, a data structure other than an array can be used to represent the area values, and such a person would know how to modify the methods described herein for such alternative embodiments. Each megapixel also adds its area to the all parents in the MSER tree at the level a child node is merged into a parent node.

One embodiment includes applying a prefix sum method to each element of the seed array in order to obtain cumulative area values. Prefix sum algorithms are well known. Any prefix-sum method can be used, and the invention is not limited to any particular method. See, e.g., Guy E. Blelloch "*Prefix Sums and Their Applications*" Technical Report CMU-CS-90-190, Department of Computer Science, Carnegie Melon University, Pittsburgh, Pa., November 1990, Available (12 Feb. 2013) at repository~dot~cmu~dot~edu/cgi/viewcontent~dot~cgi?article=3017&context=compsci, where ~dot~ is used throughout this document to denote the period character (".") of an actual URL.

The MSER detecting portion of one embodiment of the present invention includes determining, in parallel, stability values and local minima points to determine threshold levels for the MSER.

In one embodiment, the MSER detection portion of a method embodiment of the procedure comprises, in 1307, adding areas to each appropriate SNER. Parallelism is achieved across all pixels. For each pixel, starting from each catchment basin earlier computed, one version includes traversing up the MSER tree until an edge is reached whose weight greater than the pixel (or metapixel) value. The method atomically adds its area so far to the current catchment basin at its intensity level. The method continues up to the root of the MSER tree, adding its area to each node it visits at the edge weight of the edge leading to the node. The method includes calculating the prefix sum of the areas. For each seed, an array of areas is maintained, denoted area, where area(L) represents the size, e.g., the area, e.g., the number of pixels or metapixels on the level L belonging to the SNER. In order to calculate area of the extremal region at the level L, the method calculates the sum from i=the lowerBound to i=L of the areas area(i). This is achieved by calling prefix sum method implemented on GPU. See, for example, "Parallel Prefix Sum (Scan) with CUDA™," Technical Report, NVIDIA Corporation, NVIDIA Corporation, Santa Clara, Calif., April 2007, available (5 Feb. 2013) at developer~dot~download~dot~nvidia~dot~com/compute/CUDA™/1~dot~1~Beta/x86_website/projects/scan/doc/scan~dot~pdf, and Harris, Sengupta and Owens, "Parallel Prefix Sum (Scan) with CUDA™," Chapter 39 of GPU GEMS 3, by H. Nguyen, Editor, GPU Gems 3, Addison-Wesley, 2007 (ISBN 0-321-51526-9), also published by NVIDIA Corporation, Santa Clara, Calif., available 5 Feb. 2013 at http~dot~developer~dot~nvidia~dot~com/GPU-Gems3/gpugems3_ch39~dot~html. In all URL citations in this specification, "~dot~" is used to denote ".", the period character of the actual URL.

In 1309, the method includes calculating stability values and obtaining threshold levels for the MSER. Parallelism is here achieved over each seed and over each level of the each seed. Stability values are calculated in parallel according to the formula. Levels at which stability reaches local minima are also detected in parallel and assigned to the corresponding MSER seeds.

The output of this part is list of MSER seeds along with its threshold levels. One embodiment includes in 1311 labeling of each pixel, e.g., as in or out of an MSER is relatively straightforward. Other common properties may also be calculated, e.g., moments, centroids, and so forth. Other parameters such as the minimum and maximum areas for MSER, the maximum deviation of the size, and other parameters also may be calculated in a straightforward manner.

A Processing System Apparatus Embodiment

Refer again to FIG. 1 which shows a simplified block diagram of an apparatus embodiment that includes a processing system 100 comprising at least one parallel processor, e.g., the GPU 123 in the GPU subsystem 121 that includes many processing units, e.g., cores 131, and at least one other processing unit, e.g., the host processing subsystem 111. One or more of the included storage elements, e.g., one or more of the host memory 115, the global GPU memory 125, and the one or more storage elements 141, contain, in combination or separately, instructions that when executed by a combination of the processing units, carry out the different method steps of example method embodiments described herein. The instructions are shown, for purpose of explanation as instructions 117 in the host memory 115, instructions 137 in the global GPU memory 125, and instructions 147 in the one or more other storage elements 141. Note that the input to the apparatus is an image (denoted I), that the apparatus transforms the image to the MSER elements of a detected MSER and one or more properties of the detected MSER, and these form the output of the apparatus.

In one embodiment, the storage elements may store one or more parameters, which can be used, for example, to vary some of the processing steps carried out by one or both of the host's CPU(s) and the GPU subsystem's GPU cores, and that provide information for the processing stages. Such parameters may be settable, while others may be predefined. The parameters are shown in FIG. 1 as parameters 119 in the host memory 115, parameters 139 in the global GPU memory 125, and parameters 149 in the one or more other storage elements 141.

NOTATION AND NOMENCLATURE

Unless specifically stated otherwise, as apparent from the following description, it is appreciated that throughout the specification discussions utilizing terms such as "processing," "computing," "calculating," "determining" "building" "constructing" or the like, may refer to, without limitation, the action and/or processes of hardware, e.g., an electronic circuit, a computer or computing system, or similar electronic computing device, that manipulate and/or transform data represented as physical, such as electronic, quantities into other data similarly represented as physical quantities.

In a similar manner, the term "processor" is used in a broad sense to refer to any system, device or portion of a device that processes electronic data, e.g., from registers and/or memory to transform that electronic data into other electronic data that, e.g., may be stored in registers and/or memory. The data may represent video or other image data, which is converted to MSER in by the processing. A processing units may be programmable or otherwise configurable, e.g., with software or firmware. A "computer" or a "computing machine" or a "computing platform" or a processing system may include one or more processing units, and in one embodiment of the present inventions, a parallel processor includes a plurality processing units capable of simultaneous processing. Examples of a processor include a field-programmable gate array (or other configurable integrated circuit or chip set), a digital signal processor programmed and/or otherwise configured to perform pipelined processing on image or other sound data, a programmable general purpose processing system or computer that includes in addition to one or more CPUs, a GPU, and a programmable microprocessor chip or chip set that includes a parallel processing subsystem as well as a one or more standard processing units.

Throughout this disclosure, including in the claims, the expression performing an operation "on" data be used, and when so, is used in a broad sense to denote performing the operation directly on the data, or on a processed version of the data.

Throughout this disclosure including in the claims, the expression "system" is used in a broad sense to denote a device, system, or subsystem.

Note that when a method is described that includes several elements, e.g., several steps, no ordering of such elements, e.g., of such steps is implied, unless specifically stated.

Some of the steps of the methodologies described herein, in one embodiment, can be performed by a plurality of one or more processing units operating in parallel, e.g., cores of a GPU and one or more CPUs that each accept instructions, e.g., logic, e.g., software. The instructions are encoded on one or more non-transitory computer-readable media. When executed by one or more of the processing units, the instructions cause carrying out at least one of the methods described herein, including carrying out processing in parallel on a plurality of the cores of the GPU. Any processor capable of executing a set of instructions (sequential or otherwise) that specify actions to be taken is included. Thus, one example is a typical processing system that includes one or more processors. Each processor may include one or more of a CPU or similar element, a graphics processing unit (GPU), field-programmable gate array, application-specific integrated circuit, and/or a programmable DSP unit. The processing system further includes a storage subsystem with at least one storage medium, which may include memory embedded in a semiconductor device, or a separate memory subsystem including main RAM and/or a static RAM, and/or ROM, and also cache memory. The storage subsystem may further include one or more other storage devices, such as magnetic and/or optical and/or further solid state storage devices. A bus subsystem may be included for communicating between the components. The processing system further may be a distributed processing system with processors coupled by a network, e.g., via network interface devices or wireless network interface devices. If the processing system requires a display, such a display may be included, e.g., a liquid crystal display (LCD), organic light emitting display (OLED), or a cathode ray tube (CRT) display. If manual data entry is required, the processing system also includes an input device such as one or more of an alphanumeric input unit such as a keyboard, a pointing control device such as a mouse, and so forth, and an image entry device, e.g., for the system to accept an image. The term storage device, storage subsystem, or memory unit as used herein, if clear from the context and unless explicitly stated otherwise, also encompasses a storage system such as a disk drive unit. The processing system in some configurations may include a video input device, and a network interface device.

In some embodiments, a non-transitory computer-readable medium is configured with, e.g., encoded with instructions, e.g., logic that when executed by one or more processors of a processing system such as a digital signal processing device or subsystem that includes at least one processor element and a storage subsystem, cause carrying out a method as described herein. Some embodiments are in the form of the logic itself.

A non-transitory computer-readable medium is any computer-readable medium that is statutory subject matter under the patent laws applicable to this disclosure, including Section 101 of Title 35 of the United States Code. A non-transitory computer-readable medium is for example any computer-readable medium that is not specifically a transitory propagated signal or a transitory carrier wave or some other transitory transmission medium. The term "non-transitory computer-readable medium" thus covers any tangible computer-readable storage medium. Such media and may take many forms including for example, static RAM, solid state disks, optical disks, magnetic disks, and magneto-optical disks, one or more of which may be included in the processing system of FIG. 1, e.g., as the local memory of the SM multiprocessors in the GPU subsystem, as part of the "Other storage elements" box. The term "non-transitory computer-readable medium" also covers dynamic memory, such as the host memory of the host processing subsystem, the shared GPU memory in the GPU processing subsystem, and hardware registers in any of these elements.

In a typical processing system as described above, the storage subsystem thus includes a computer-readable storage medium that is configured with, e.g., encoded with instructions, e.g., logic, e.g., software that may need to be compiled, or may have been compiled, and that when executed by one or more CPUs, GPUs, or other processing elements described herein, causes carrying out one or more of the method steps described herein. The software may reside in a hard disk, or may also reside, completely or at least partially, within one or both of the host processing system and the GPU memory (See FIG. 1). Thus, the instructions when in any of the memory and the processor registers also constitute a non-transitory computer-readable medium on which can be encoded instructions to cause, when executed, carrying out method steps.

While the computer-readable medium is shown in an example embodiment to be a single medium, the term "medium" should be taken to include a single medium or multiple media (e.g., several memories, a centralized or distributed database, and/or associated caches and servers) that store the one or more sets of instructions.

Furthermore, a non-transitory computer-readable medium, e.g., a computer-readable storage medium may form a computer program product, or be included in a computer program product.

In alternative embodiments, the one or more GPUs and one or more host CPUs operate together a standalone processing system or may be connected, e.g., networked to other processor(s), in a networked deployment, or the one or more processors may operate in the capacity of a server or a client machine in server-client network environment, or as a peer machine in a peer-to-peer or distributed network environment. The term processing system encompasses all such possibilities, unless explicitly excluded herein. The one or more GPUs and one or more host CPUs may form a personal computer (PC), a video playback device, a camera, a tablet PC, a set-top box (STB), a Personal Digital Assistant (PDA), a game machine, a Web appliance, a network router, switch or bridge, or any machine capable of executing a set of instructions in parallel, typically combined with a (sequential) machine specify actions to be taken by that machine.

Note that the number of processing subsystems, GPUs, memories, etc., shown in some diagram(s), those skilled in the art will understand that many of the components described above are included, but not explicitly shown or described in order not to obscure the inventive aspect. For example, while only a single machine is illustrated, the term "machine" shall also be taken to include any collection of machines, including at least one parallel machine, that individually or jointly execute a set (or multiple sets) of instructions to perform any one or more of the methodologies discussed herein.

Thus, as will be appreciated by those skilled in the art, embodiments of the present invention may be embodied as a method, an apparatus such as a special purpose apparatus, an apparatus as a processing system that includes a parallel processor, instructions, e.g., logic, e.g., software, embodied in a non-transitory computer-readable medium, or a computer-readable medium that is configured with instructions, e.g., a computer-readable storage medium configured as a computer program product. The instructions further may be hard wired. Accordingly, aspects of the present invention may take the form of a method, an entirely hardware embodiment, an entirely software embodiment or an embodiment combining software and hardware aspects. Furthermore, the present invention may take the form of program logic, e.g., a computer program on a computer-readable storage medium, or the computer-readable storage medium configured with computer-readable program code, e.g., a computer program product.

It will also be understood that embodiments of the present invention are not limited to any particular implementation or programming technique and that the invention may be implemented using any appropriate techniques for implementing the functionality described herein. Furthermore, embodiments are not limited to any particular programming language or operating system.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the DESCRIPTION OF EXAMPLE EMBODIMENTS are hereby expressly incorporated into this DESCRIPTION OF EXAMPLE EMBODIMENTS, with each claim standing on its own as a separate embodiment of this invention.

Reference throughout this disclosure to "one embodiment," "an embodiment," "some embodiments," or "embodiments" means that a particular feature, structure or characteristic described in connection with the embodiment is included in at least one embodiment of the present invention. Thus, appearances of the phrases "in one embodiment" or "in an embodiment" in various places throughout this specification may but do not necessarily all refer to the same embodiment. Furthermore, the particular features, structures or characteristics may be combined in any suitable manner, as would be apparent to one of ordinary skill in the art from this disclosure, in one or more embodiments.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

The appended claims are expressly incorporated by reference into the disclosure and form an integral part of the disclosure, with each claim describing one or more separate embodiments of the invention. All publications, U.S. patents, U.S. patent applications, and International (PCT) patent applications designating the United States cited herein are hereby incorporated by reference, except in those jurisdictions that do not permit incorporation by reference, in which case the Applicant reserves the right to insert any portion of, or all of such material into the specification by amendment without such insertion considered new matter. In the case the patent Rules or Statutes do not permit incorporation by reference of material that itself incorporates information by reference, the incorporation by reference of the material herein excludes any information incorporated by reference in such incorporated by reference material, unless such information is explicitly incorporated herein by reference.

Any discussion of other art in this specification should in no way be considered an admission that such art is widely known, is publicly known, or forms part of the general knowledge in the field at the time of invention.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting of only elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other, but may be. Thus, the scope of the expression "a device A coupled to a device B" should not be limited to devices or systems wherein an input or output of device A is directly connected to an output or input of device B. It means that there exists a path between device A and device B which may be a path including other devices or means in between. Furthermore, coupled to does not imply direction. Hence, the expression "a device A is coupled to a device B" may be synonymous with the expression "a device B is coupled to a device A." "Coupled" may mean that two or more elements are either in direct physical or electrical contact, or that two or more elements are not in direct contact with each other but yet still co-operate or interact with each other. The term "operatively coupled" sometimes is used.

In addition, use of the "a" or "an" are used to describe elements and components of the embodiments herein. This is done merely for convenience and to give a general sense of the invention. This description should be read to include one or at least one and the singular also includes the plural unless it is obvious that it is meant otherwise.

Thus, while there has been described what are believed to be the preferred embodiments of the invention, those skilled in the art will recognize that alternate embodiments of the invention may include modifications and other elements and, and it is intended to claim all such modifications and other elements, to the extent permitted by law. For example, to the extent permitted by law: any formulas given above are merely representative of procedures that may be used; functionality may be added or deleted from the block diagrams and operations may be interchanged among functional blocks; and steps may be added to or deleted from methods described within the scope of the present invention.

What is claimed is:

1. A method of operating a processing system that includes one or more parallel processors to determine MSERs of an input image, the method comprising:
accepting an input image into the processing system;
forming metapixels from the input image by labeling each respective connected region in the input image consisting of all connected pixels having the same respective intensity level as a respective metapixel;
connecting all metapixels of the input image to their corresponding local minima to determining a catchment basin for each metapixel, including carrying out a first set of operations executed in parallel on at least one of the one or more parallel processors;
identifying which of the catchment basins are connected, and connecting the catchment basins to form an MSER data structure, including carrying out a second set of operations executed in parallel on at least one of the one or more parallel processors;
determining the area of each region at each level of the MSER data structure, calculating a measure of stability and any local minimum in the calculated stability, wherein a local minimum indicates detection of an MSER,
wherein the forming of the megapixels uses a parallel method for connected component labeling using at least one of the parallel processors, and/or wherein the connecting of the metapixels includes using at least one of the parallel processors to carry out watershed operations in parallel on the metapixels to determine the catchment basins,
such that the detected MSERs of the accepted image are available to one or more computer vision tasks.

2. A method as recited in claim 1, wherein the determining of the catchment basins comprises carrying out watershed operations using topographic distance on metapixels, the watershed operations including operations in parallel on at least one of the one or more parallel processors.

3. A method as recited in claim 2, wherein the forming of the MSER data structure comprises building a watershed graph to identify which catchment basins are connected, wherein each catchment basin is a node in the watershed graph, and edges are ridge levels where two catchment basins are connected.

4. A method as recited in claim 2, wherein the forming of the MSER data structure comprises building a watershed graph to identify which catchment basins are connected, wherein each catchment basin is a node in the watershed graph, and edges are ridge levels where two catchment basins are connected, and further comprises converting the watershed graph into the MSER data structure in the form of an MSER tree, including connecting the catchment basins into the MSER tree according to level at which catchment basins are merged.

5. A method as recited in claim 1, wherein at least one of the one or more parallel processors is a GPU that has a plurality of cores that can carry out operations in parallel, and wherein the first and second sets of operations are executed in parallel on the GPU.

6. A method as recited in claim 1, wherein at least one of the one or more parallel processors is a GPU that has a plurality of cores that operate in parallel, and the processing system includes a processing subsystem that includes one or more host processing elements, wherein the combination of the GPU and the processing subsystem are programmable using a set of programming models and related programming tools.

7. A method as recited in claim 6, wherein the set of programming models and related programming tools comprises a proprietary programming model and related proprietary programming tools.

8. A method as recited in claim 6, wherein the set of programming models and related programming tools conform to the Open Computing Language royalty-free standard.

9. A processing system apparatus configured to determine MSER of an image, the apparatus comprising:
  one or more parallel processors each comprising a plurality of parallel processing elements that can operate in parallel;
  a processing subsystem operatively coupled to the one or more parallel processors, and comprising one or more host processor elements, and,
  one or more storage elements, including at least one device memory coupled to the parallel processors, and at least one host memory coupled to the host processing subsystem,
wherein the one or more storage elements comprises instructions that when executed by the combination of at least one of the parallel processors and at least one of the one or more host processor elements, cause the processing system to carry out a method of determining MSERs of an image, the method comprising:
  accepting an input image into the processing system apparatus;
  forming metapixels from the input image by labeling each respective connected region in the input image consisting of all connected pixels having the same respective intensity level as a respective metapixel;
  connecting all metapixels of the input image to their corresponding local minima to determining a catchment basin for each metapixel, including carrying out including carrying out a first set of operations executed in parallel on at least one of the one or more parallel processors;
  identifying which of the catchment basins are connected, and connecting the catchment basins to form an MSER data structure, including carrying out a second set of operations executed in parallel on at least one of the one or more parallel processors;
  determining the area of each region at each level of the MSER data structure, calculating a measure of stability and any local minimum in the calculated stability, wherein a local minimum indicates detection of an MSER,
wherein the forming of the megapixels uses a parallel method for connected component labeling using at least one of the parallel processors, and/or wherein the connecting of the metapixels includes using at least one of the parallel processors to carry out watershed operations in parallel on the metapixels to determine the catchment basins,
such that the detected MSERs of the accepted image are available to one or more computer vision tasks.

10. A processing system apparatus as recited in claim 9, wherein the determining of the catchment basins comprises carrying out watershed operations using topographic distance on metapixels, the watershed operations including operations in parallel on at least one of the one or more parallel processors.

11. A processing system apparatus as recited in claim 10, wherein the forming of the MSER data structure comprises building a watershed graph to identify which catchment basins are connected, wherein each catchment basin is a node in the watershed graph, and edges are ridge levels where two catchment basins are connected.

12. A processing system apparatus as recited in claim 10, wherein the forming of the MSER data structure comprises building a watershed graph to identify which catchment basins are connected, wherein each catchment basin is a node in the watershed graph, and edges are ridge levels where two catchment basins are connected, and further comprises converting the watershed graph into the MSER data structure in the form of an MSER tree, including connecting the catchment basins into the MSER tree according to level at which catchment basins are merged.

13. A processing system apparatus as recited in 9, wherein at least one of the one or more parallel processors is a GPU that has a plurality of cores that can carry out operations in parallel, and wherein the first and second sets of operations are executed in parallel on the GPU.

14. A processing system apparatus as recited in claim 9, wherein at least one of the one or more parallel processors is a GPU that has a plurality of cores that operate in parallel, and the processing system includes a processing subsystem that includes one or more host processing elements, wherein the combination of the GPU and the processing subsystem are programmable using a set of programming models and related programming tools.

15. A non-transitory computer-readable storage medium encoded with instructions that when executed in a processing system that includes at least one parallel processor and may include a host processing subsystem, cause the processing system to carry out a method of determining MSER of an image, the method comprising:
  accepting an input image into the processing system;
  forming metapixels from the input image by labeling each respective connected region in the input image consisting of all connected pixels having the same respective intensity level as a respective metapixel;
  connecting all metapixels of the input image to their corresponding local minima to determining a catchment basin for each metapixel, including carrying out including carrying out a first set of operations executed in parallel on at least one of the one or more parallel processors;
  identifying which of the catchment basins are connected, and connecting the catchment basins to form an MSER data structure, including carrying out a second set of operations executed in parallel on at least one of the one or more parallel processors;
  determining the area of each region at each level of the MSER data structure, calculating a measure of stability and any local minimum in the calculated stability, wherein a local minimum indicates detection of an MSER,
wherein the forming of the megapixels uses a parallel method for connected component labeling using at least one of the parallel processors, and/or wherein the connecting of the metapixels includes using at least one of the parallel processors to carry out watershed operations in parallel on the metapixels to determine the catchment basins,
such that the detected MSERs of the accepted image are available to one or more computer vision tasks.

16. A non-transitory computer-readable storage medium as recited in claim 15, wherein the determining of the catchment basins comprises carrying out watershed operations using topographic distance on metapixels, the watershed operations including operations in parallel on at least one of the one or more parallel processors.

17. A non-transitory computer-readable storage medium as recited in claim 16, wherein the forming of the MSER data structure comprises building a watershed graph to identify which catchment basins are connected, wherein each catchment basin is a node in the watershed graph, and edges are ridge levels where two catchment basins are connected.

18. A non-transitory computer-readable storage medium as recited in claim 16, wherein the forming of the MSER data structure comprises building a watershed graph to identify which catchment basins are connected, wherein each catchment basin is a node in the watershed graph, and edges are ridge levels where two catchment basins are connected, and further comprises converting the watershed graph into the MSER data structure in the form of an MSER tree, including connecting the catchment basins into the MSER tree according to level at which catchment basins are merged.

19. A non-transitory computer-readable storage medium as recited in claim 15, wherein at least one of the one or more parallel processors is a GPU that has a plurality of cores that can carry out operations in parallel, and wherein the first and second sets of operations are executed in parallel on the GPU.

20. A non-transitory computer-readable storage medium as recited in claim 15, wherein at least one of the one or more parallel processors is a GPU that has a plurality of cores that operate in parallel, and the processing system includes a processing subsystem that includes one or more host processing elements, wherein the combination of the GPU and the processing subsystem are programmable using a set of programming models and related programming tools.

21. A method as recited in claim 1, wherein the forming of megapixels includes carrying out a parallel method for connected component labeling using at least one of the parallel processors.

\* \* \* \* \*